(12) United States Patent
Ho et al.

(10) Patent No.: US 12,457,013 B2
(45) Date of Patent: Oct. 28, 2025

(54) METHODS AND SYSTEMS FOR NEAR-FIELD COMMUNICATION

(71) Applicant: National University of Singapore, Singapore (SG)

(72) Inventors: John S Y Ho, Singapore (SG); Rongzhou Lin, Singapore (SG); Han-Joon Kim, Singapore (SG); Sippanat Achavananthadith, Singapore (SG); Selman Ahmet Kurt, Singapore (SG)

(73) Assignee: National University of Singapore, Singapore (SG)

( * ) Notice: Subject to any disclaimer, the term of this patent is extended or adjusted under 35 U.S.C. 154(b) by 542 days.

(21) Appl. No.: 17/774,924

(22) PCT Filed: Nov. 17, 2020

(86) PCT No.: PCT/SG2020/050667
§ 371 (c)(1),
(2) Date: May 6, 2022

(87) PCT Pub. No.: WO2021/107864
PCT Pub. Date: Jun. 3, 2021

(65) Prior Publication Data
US 2023/0029417 A1  Jan. 26, 2023

(30) Foreign Application Priority Data
Nov. 27, 2019  (SG) .............. 10201911213R

(51) Int. Cl.
*H04B 5/79* (2024.01)
*A61B 5/00* (2006.01)
(Continued)

(52) U.S. Cl.
CPC ............... *H04B 5/79* (2024.01); *A61B 5/002* (2013.01); *A61B 5/6804* (2013.01); *H02J 50/10* (2016.02); *H02J 50/80* (2016.02); *H04B 5/24* (2024.01)

(58) Field of Classification Search
CPC .. H04B 5/79; H04B 5/24; A61B 5/002; A61B 5/6804; H02J 50/10; H02J 50/80
See application file for complete search history.

(56) References Cited

U.S. PATENT DOCUMENTS 9,779,352 B1 * 10/2017 Hyde .................. A61B 5/117
9,859,747 B2 *  1/2018 Hwang ................ H02J 7/342
(Continued)

FOREIGN PATENT DOCUMENTS

CN  206024138 U  3/2017
CN  107811616 A  3/2018
(Continued)

OTHER PUBLICATIONS

Lin et al., "Wireless battery-free body sensor networks using near-field-enabled clothing," Nature Communications, Jan. 23, 2020, vol. 11, (10 pages).
(Continued)

*Primary Examiner* — Lewis G West
(74) *Attorney, Agent, or Firm* — Michael Best & Friedrich LLP

(57) ABSTRACT

Methods and systems for a near-field communication. In one aspect, a method of fabricating a relay for a near-field communication system comprises the steps of providing a flexible substrate; and providing an electric circuit on the flexible substrate, wherein the electric circuit comprises a hub inductor pattern configured to receive and transmit via electro-magnetic induction; one or more terminal inductor patterns laterally spaced apart from the hub inductor pattern
(Continued)

relative to a surface of the flexible substrate and configured to receive and transmit via electro-magnetic induction; and a connecting trace between the hub inductor and the one or more terminal inductors.

20 Claims, 24 Drawing Sheets

(51) Int. Cl.
  *H02J 50/10* (2016.01)
  *H02J 50/80* (2016.01)
  *H04B 5/24* (2024.01)

(56) References Cited

U.S. PATENT DOCUMENTS

| | | | | |
|---|---|---|---|---|
| 10,623,112 | B2* | 4/2020 | Park | H04B 13/005 |
| 11,096,429 | B2* | 8/2021 | Riehl | H02J 50/402 |
| 11,395,519 | B2* | 7/2022 | Bean | H02J 7/0044 |
| 11,399,579 | B2* | 8/2022 | Bean | H02J 7/0044 |
| 11,670,856 | B2* | 6/2023 | Singh | H04B 5/26 343/866 |
| 2002/0154518 | A1* | 10/2002 | Elferich | H02J 50/12 363/15 |
| 2007/0132375 | A1 | 6/2007 | Bachmann et al. | |
| 2008/0262376 | A1 | 10/2008 | Price | |
| 2009/0231125 | A1 | 9/2009 | Baldus et al. | |
| 2012/0282419 | A1 | 11/2012 | Ahn et al. | |
| 2014/0031892 | A1* | 1/2014 | Mashiach | A61N 1/0558 607/46 |
| 2014/0339700 | A1 | 11/2014 | Ren et al. | |
| 2015/0138743 | A1* | 5/2015 | Roy | H01F 17/0006 174/251 |
| 2015/0359485 | A1* | 12/2015 | Berg | A61B 5/24 600/388 |
| 2016/0111180 | A1 | 4/2016 | Joo et al. | |
| 2016/0322156 | A1* | 11/2016 | Yeh | H04B 5/24 |
| 2017/0244285 | A1* | 8/2017 | Raj | H02J 50/20 |
| 2018/0125122 | A1* | 5/2018 | Malhotra | A41D 1/005 |
| 2018/0337411 | A1 | 11/2018 | Ozyilmaz et al. | |
| 2019/0080713 | A1 | 3/2019 | Ozyilmaz et al. | |
| 2019/0298265 | A1 | 10/2019 | Keating et al. | |
| 2020/0296825 | A1* | 9/2020 | Ozdoganlar | H01L 23/4985 |

FOREIGN PATENT DOCUMENTS

| | | |
|---|---|---|
| CN | 108652095 A | 10/2018 |
| CN | 109554315 A | 3/2019 |
| CN | 209183284 U | 7/2019 |
| CN | 110098001 A | 8/2019 |
| KR | 1020180135694 A | 12/2018 |
| WO | 2018156082 A1 | 8/2018 |
| WO | 2019203737 A1 | 10/2019 |

OTHER PUBLICATIONS

International Search Report and Written Opinion for Application No. PCT/SG2020/050667 dated Feb. 18, 2021 (17 pages).

Moore, "International Roadmap for Devices and Systems," IEEE, 2017 (36 pages).

Zhu et al., "Phonons, Localization, and Thermal Conductivity of Diamond Nanothreads and Amorphous Graphene," Nano Letters, published Jul. 7, 2016, vol. 16, pp. 4763-4772.

Griffin et al., "Proton and Li-Ion Permeation through Graphene with Eight-Atom-Ring Defects," ACS Nano, vol. 14, 2020, pp. 7280-7286.

Luo et al., "Influence of Source and Drain Contacts on the Properties of Indium-Gallium-Zinc-Oxide Thin-Film Transistors based on Amorphous Carbon Nanofilm as Barrier Layer," ACS Applied Materials & Interfaces, vol. 7, Published Jan. 26, 2015, pp. 3633-3640.

Zheng et al., "Interconnected hollow carbon nanospheres for stable lithium metal anodes," Nature Nanotechnology, vol. 9, published Jul. 27, 2014, pp. 618-623.

Ho, "Wireless Body Sensor Networks with Metamaterial Textiles," IEEE, Aug. 4, 2019, p. 89.

* cited by examiner

METHODS AND SYSTEMS FOR NEAR-FIELD COMMUNICATION

CROSS REFERENCE TO RELATED APPLICATIONS

This application is a national stage filing under 35 U.S.C. § 371 of International Patent Application No.: PCT/SG2020/050667, filed Nov. 17, 2020, which claims priority to Singapore patent application Ser. No. 10201911213R, filed Nov. 27, 2019, the entire contents of all of which are hereby incorporated by reference herein.

FIELD OF INVENTION

The present invention relates broadly to methods and systems for a near-field communication.

BACKGROUND

Any mention and/or discussion of prior art throughout the specification should not be considered, in any way, as an admission that this prior art is well known or forms part of common general knowledge in the field.

Networks of skin/implanted sensors can provide continuous measurement of human physiological signals for applications in clinical diagnostics, athletics, and human-machine interfaces. Wireless and battery-free sensors are particularly desirable for reliable long-term monitoring. But current approaches relying on near-field communication, NFC, require close proximity (at most a few centimetres) between each sensor and a wireless readout device, which severely limits the practical implementation of existing NFC-based systems. Other conventional wireless technologies such as Bluetooth require battery for each sensor node and their radiation nature result in vulnerable to eavesdropping.

As such, current solutions for wireless sensor interconnection either (i) require each sensor to be independently powered (such as with batteries) or (ii) have a very limited range of operation (few centimeters).

An alternative approach using electronic textiles in which the sensors or readout circuits are directly incorporated into clothing, has disadvantages due to the electronic components being vulnerable to washing and daily wear, and not conformal on the human body.

Embodiments of the present invention seek to address at least one of the above problems.

SUMMARY

In accordance with a first aspect of the present invention, there is provided a relay for a near-field communication system comprising:
  a flexible substrate; and
  an electric circuit on the flexible substrate,
  wherein the electric circuit comprises
    a hub inductor pattern configured to receive and transmit via electro-magnetic induction;
    one or more terminal inductor patterns laterally spaced apart from the hub inductor pattern relative to a surface of the flexible substrate and configured to receive and transmit via electro-magnetic induction; and
    a connecting trace between the hub inductor and the one or more terminal inductors.

In accordance with a second aspect of the present invention, there is provided a near-field communication system comprising one or more relays of the first aspect.

In accordance with a third aspect of the present invention, there is provided a conductive tubing comprising:
  a tubing element capable of being embroidered on a textile; and
  Galinstan filled into the tubing element.

In accordance with a fourth aspect of the present invention, there is provided a wearable wireless powering system comprising:
  a flexible substrate having an inductor pattern formed thereon; and
  a powering source comprising a battery and a circuit on a flexible print circuit board, the powering source configured to be attachable to the flexible substrate;
  wherein the powering source is further configured for near-field power transmission via the inductor pattern when attached to the flexible substrate.

In accordance with a fifth aspect of the present invention, there is provided a method of fabricating a relay for a near-field communication system, comprising the steps of:
  providing a flexible substrate; and
  providing an electric circuit on the flexible substrate,
  wherein the electric circuit comprises
    a hub inductor pattern configured to receive and transmit via electro-magnetic induction;
    one or more terminal inductor patterns laterally spaced apart from the hub inductor pattern relative to a surface of the flexible substrate and configured to receive and transmit via electro-magnetic induction; and
    a connecting trace between the hub inductor and the one or more terminal inductors.

In accordance with a sixth aspect of the present invention, there is provided a method of fabricating a conductive tubing structure, comprising the steps of:
  providing a tubing element capable of being embroidered on a textile; and
  filling Galinstan into the tubing element.

In accordance with a seventh aspect of the present invention, there is provided a method of fabricating a wearable wireless powering system, comprising the steps of:
  providing a flexible substrate having an inductor pattern formed thereon; and
  providing a powering source comprising a battery and a circuit on a flexible print circuit board, the powering source configured to be attachable to the flexible substrate;
  wherein the powering source is further configured for near-field power transmission via the inductor pattern when attached to the flexible substrate.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 10a shows the magnetic field generated by designs (1) partial circular (7.2 cm diameter, left), (2) rectangular (10 cm length, 4 cm width, middle) and (3) filled circular (10 cm diameter, 70% area filling ratio, right), according to example embodiments. Designs (1) and (2) have an area filling ratio of 38%.

FIG. 10b shows the corresponding magnetic field pro files along the dashed white lines in FIG. 10a.

FIG. 10c shows the corresponding variation of power transfer efficiency η with moving the senor node away from the terminal along vertical direction for designs (1) and (2). When the sensor node is moved along the vertical direction, there is no misalignment, w=0 cm.

FIG. 10d shows the corresponding variation of power transfer efficiency η with moving the senor node away from the terminal along lateral direction for designs (1) and (2). When the sensor node is moved along the lateral direction, the height is fixed at h=1 cm.

DETAILED DESCRIPTION

Embodiments of the present invention provide near-field-enabled clothing capable of establishing wireless power and data connectivity between multiple distant points (up to meter scale) on the body to implement a network of battery-free sensors. Using computer-controlled embroidery of flexible wires, example embodiment integrate clothing with near-field-responsive patterns that are preferably well conformal to body surface and free of fragile silicon components. An embroidery-compatible conductive tubing with both high electrical conductivity and mechanical flexibility/stability is developed according to an example embodiment to enable the clothing with high power transfer efficiency and long-term stable/comfortable for daily wear. The clothing according to example embodiments is used to wirelessly interconnect a network of sensors distributed up to a meter around the body to a wearable reader in an example implementation to demonstrate the utility of the system according to example embodiments for real-time, multi-node measurement of spinal posture, continuous sensing of temperature and gait during exercise, and wireless powering implanted devices.

Figure 1A:
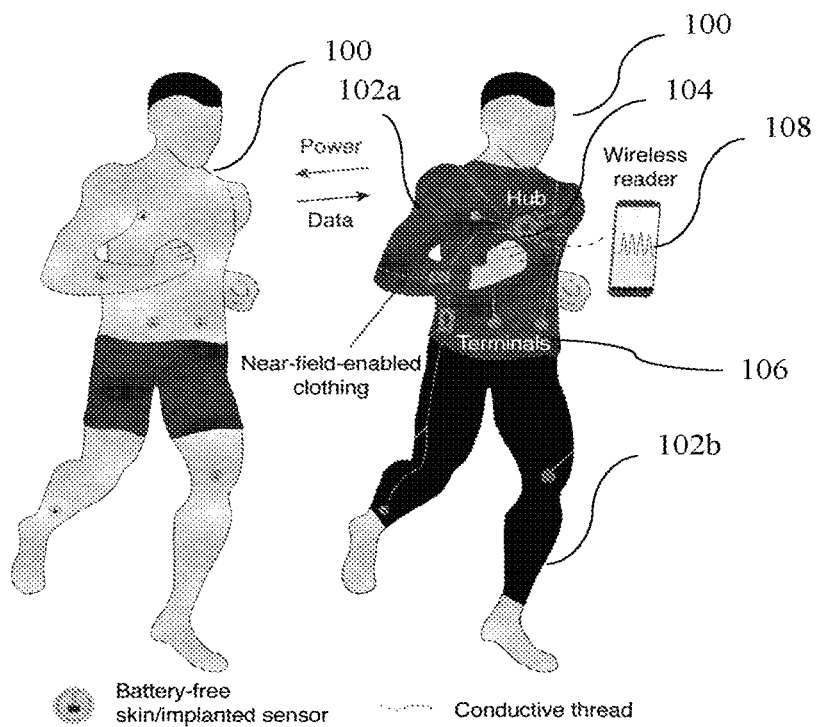
FIG. 1a shows a schematic illustration of multiple battery-free skin/implanted sensors (left) and interconnected to a wireless device through the near-field-enabled clothing (right) in a battery-free sensor networks based on near-field-enabled clothing, according to an example embodiment.
Figure 1B:
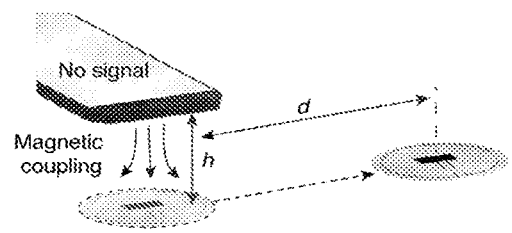
FIG. 1B shows a schematic drawing illustrating that conventional near-field communication is limited to at most a few centimetres separation between the reader and sensor.
Figure 1C:
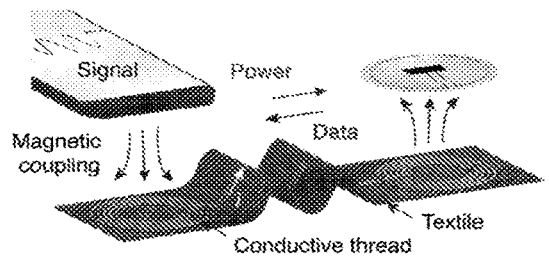
FIG. 1c shows a schematic drawings illustrating that a near-field relay according to an example embodiment enable near-field connectivity up meter scale in separation.
Figure 1D:
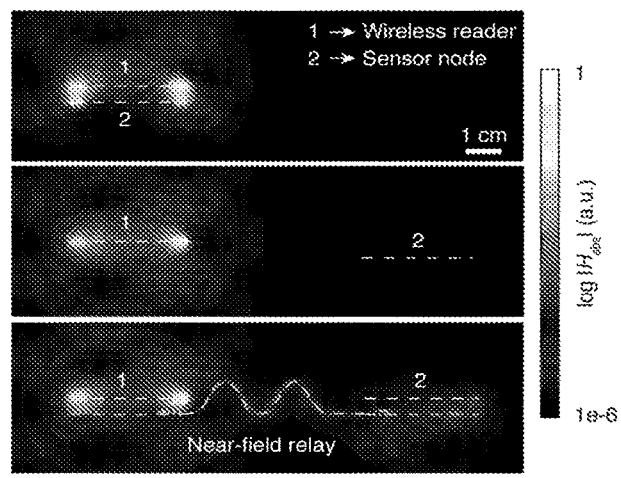
FIG. 1d shows the normalised magnetic field $|H_{abs}|$ generated by a reader directly above a sensor (top), the reader off-set from sensor (centre), and the reader interconnected to a sensor by a near-field relay according to an example embodiment (bottom). Reader and sensor diameters are 31 mm and displacements h=5 mm and d=80 mm.

Near-field-enabled clothing according to example embodiments can enable continuous physiological monitoring with battery-free sensors by wirelessly connecting near-field-communication (NFC)-based devices, here skin/implanted sensors e.g. 101, at arbitrary positions on the body to a wireless reader, as shown in FIG. 1a where the left shows the person 100 without the near-field enabled clothing according to an example embodiment, here a shirt and pants 102a,b, and the right shows the (same) person 100 with the short and pants 102a,b. The shirt and pants 102a, b incorporates connected planar inductor patterns e.g. hub 104, terminal 106, that function as relays between physically separated locations, fabricated by embroidering conductive thread/tubing on conventional textiles. It is noted that the designation as "hub" or "terminal" can be interchangeable. When a wireless reader, here in the form of a mobile phone 108, is placed in close proximity to such an inductor pattern (e.g. hub 104), a time-varying magnetic field (13.56 MHz industrial, scientific, and medical band in one example embodiment) induces current throughout the relay as illustrated in FIG. 1b,c, generating magnetic "hotspots" simultaneously at the terminal e.g. 106 ends of the relay that enable connectivity with sensors otherwise beyond the range of conventional NFC, as illustrated in FIG. 1d. Whereas standard NFC-based sensor implementations allow a sensor-reader separation of at most a few centimetres (typically <4 cm for mobile devices), near-field relays according to example embodiments of the present invention advantageously enable distant operation (up to meter scale), provided that the sensor and reader are within the near-field of the respective inductor patterns, for example mobile phone 108 within near-filed of hub 104, and sensor e.g. 101 within near-filed of terminal 106.

Figure 1E:
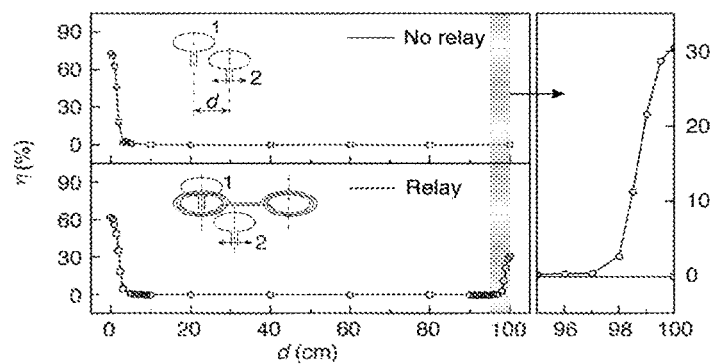
FIG. 1e shows the wireless power transfer efficiency η as a function of separation distance d between the reader to the sensor without (upper graph) and with (lower graph) a 1-m length relay according to an example embodiment.
Figure 2:
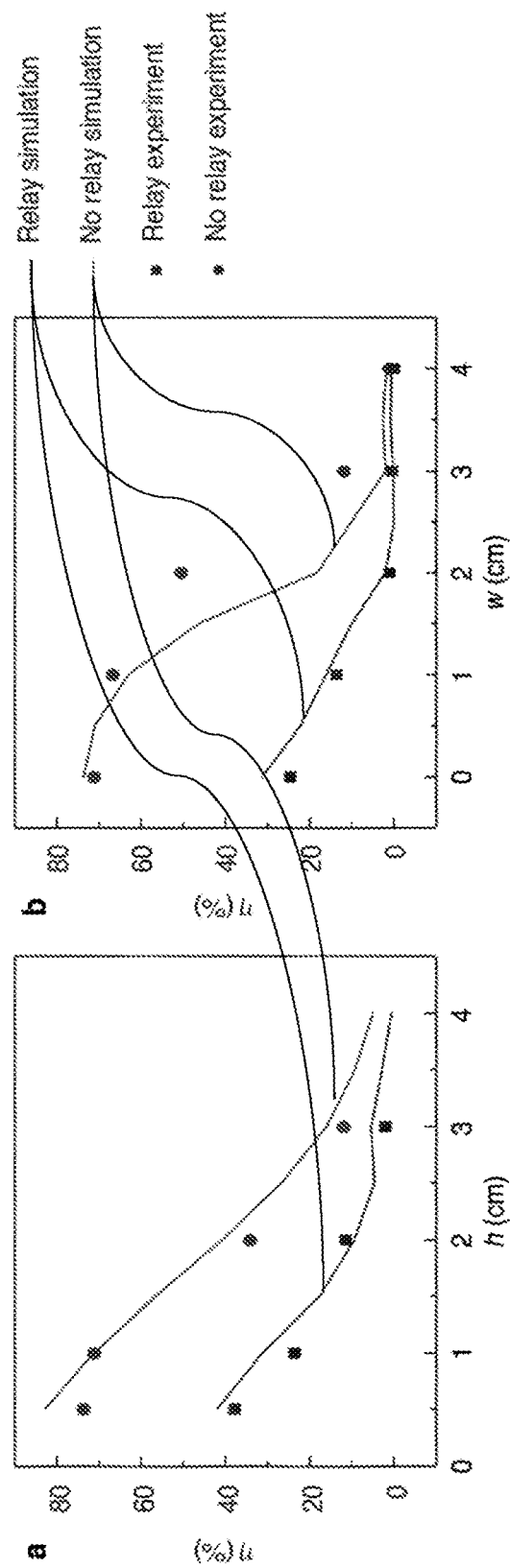
FIG. 2a shows the variation of power transfer efficiency η with moving the senor node away from the power source (without relay) or the terminal (with relay according to an example embodiment) along vertical direction. At the condition of using a 1-m long relay, the reader is placed on top of the hub with 1-cm spacing. When moving along the vertical direction, there is not misalignment w=0 cm.
FIG. 2b shows the variation of power transfer efficiency η with moving the senor node away from the power source (without relay) or the terminal (with relay according to an example embodiment). At the condition of using a 1-m long relay, the reader is placed on top of the hub with 1-cm spacing. When moving along the lateral direction, the height is fixed at h=1 cm.

FIG. 1e illustrates the function of a 1-m near-field relay for an NFC system in which the reader and sensor are modeled by concentric 3.1-cm diameter coils. As a measure of the wireless interaction strength, the wireless power transfer efficiency $$\eta = \frac{\kappa^2 Q_1 Q_2}{\left(1 + \sqrt{1 + \kappa^2 Q_1 Q_2}\right)^2}$$

is evaluated under ideal impedance matching conditions, which is a function of only the quality factor of the reader inductor $Q_1$, quality factor of the sensor inductor $Q_2$, and the coupling coefficient $\kappa$. Full-wave simulations show that $\eta$ falls from 70% in the concentric configuration to 1% when the sensor is laterally displaced by 5 cm without the relay, as shown in the upper graph 110 in FIG. 1e. Placing the reader 1 cm above the hub 104 of the relay according to an example embodiment, however, creates a magnetic hotspot at the terminal 106 end of the relay 1 m away in which the field amplitude is increased by about five orders of magnitude compared to the filed at the same distance without the relay), enabling $\eta$ to reach 30% in the region where previously no connectivity can be established, compare graphs 110, 112, and zoomed-in graph 114. As can be seen from graph 114, within 1.5 cm of the centre of the hotspot, $\eta$ exceeds 10%, which is found sufficient to perform reliable energy and data transfer via NFC. Advantageously, the near-field wireless data transmission according to example embodiments remains physically secure against eavesdropping attacks because the operating range in both the vertical and lateral directions is limited to about 4 cm from the source at either end of the relays, e.g. hub 104 and terminal 106. FIG. 2a,b show the variation of power transfer efficiency $\eta$ with moving the sensor node away from the power source (without relay) or the terminal (i.e. with the relay according to an example embodiment) along vertical direction and lateral direction, respectively. At the condition of using a 1-m long relay in this example embodiment, the reader is placed on top of the hub with 1-cm spacing. When moving along the vertical direction, there is not misalignment w=0 cm. When moving along the lateral direction, the height is fixed at h=1 cm. Simulation and experimental data are shown.

Design, Fabrication and Characterisation According to Example Embodiments

Figure 3A:
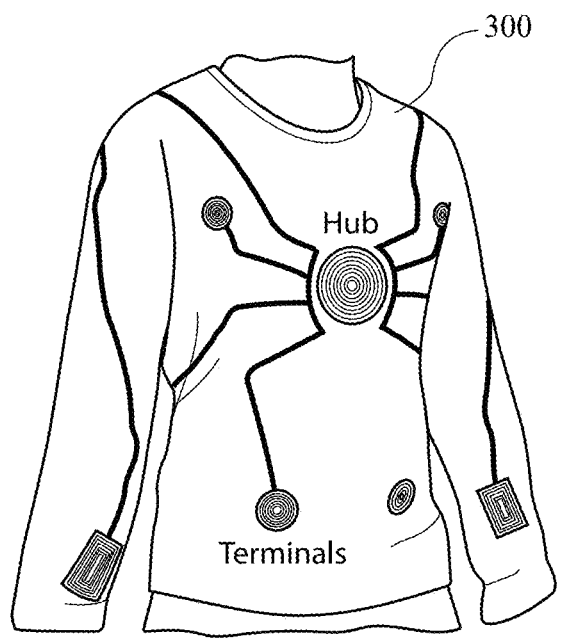
FIG. 3a shows a photograph of a near-field-enabled long-sleeved shirt according to an example embodiment comprising a network with a single hub and eight terminals.
Figure 3B:
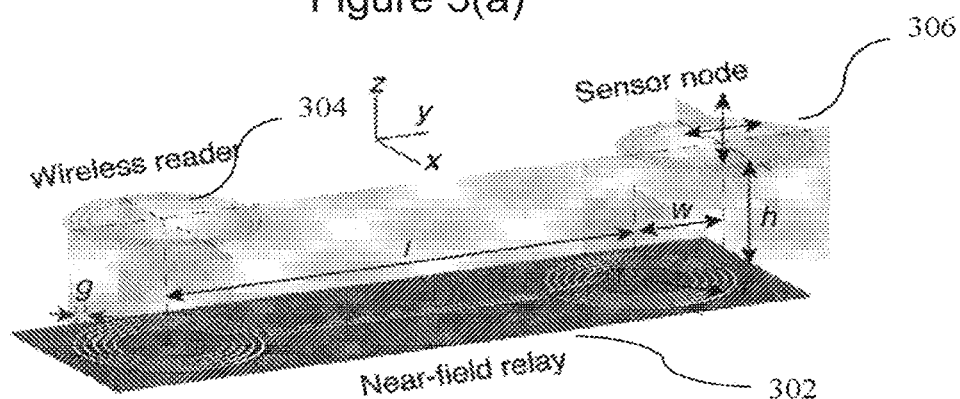
FIG. 3b shows a schematic drawings illustrating the configuration of a the near-field relay according to an example embodiment when interconnecting a wireless reader with a sensor node.

The near-field-enabled clothing capable of establishing near-field connectivity across wrists and torso was designed and fabricated in the form of a long-sleeved shirt 300 shown in FIG. 3a, for cooperation with a smartphone reader in this example embodiment. A design process based on circuit models and full-wave simulations was used to optimise $\eta$ as a function of the geometrical parameters, illustrated in a standard configuration of a relay 302 in FIG. 3b.

Figure 3C:
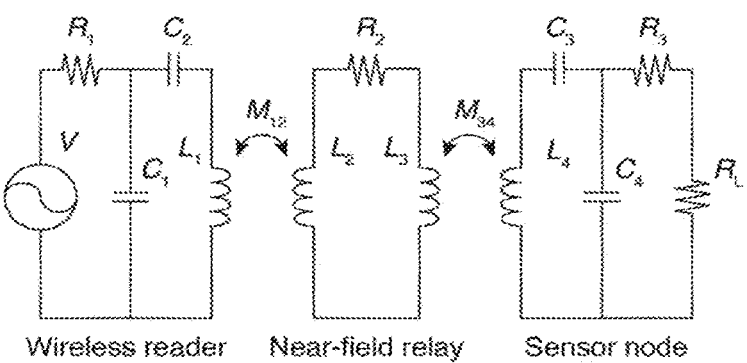
FIG. 3c shows a circuit model of the relay system of FIG. 3b.
Figure 3D:
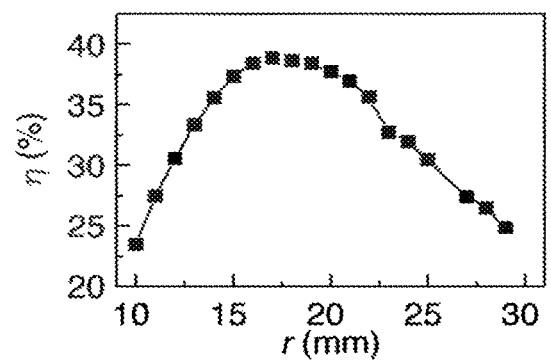
FIG. 3d shows the dependence of power transfer efficiency η on radius r of the inductors of the relay according to example embodiments when the power is transferred from the power source to the inductor.
Figure 3E:
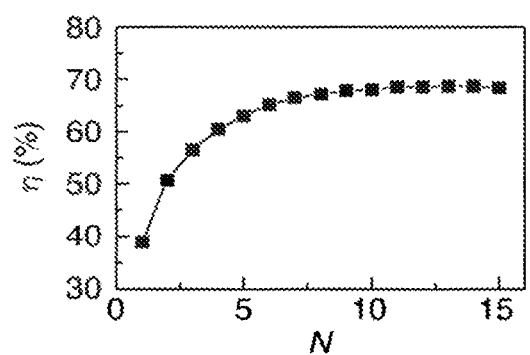
FIG. 3e shows the dependence of power transfer efficiency η on turn number N of the inductors of the relay according to example embodiments when the power is transferred from the power source to the inductor.
Figure 3F:
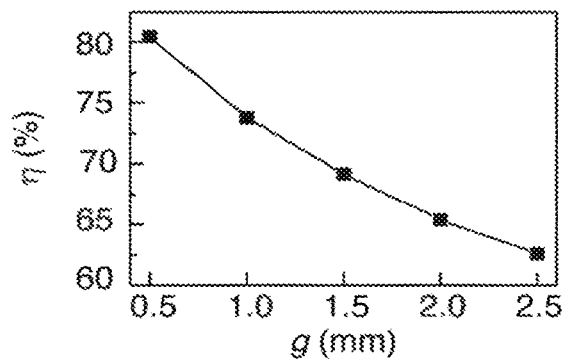
FIG. 3f shows the dependence of power transfer efficiency η on wire gap g of the inductors of the relay according to example embodiments when the power is transferred from the power source to the inductor.
Figure 3G:
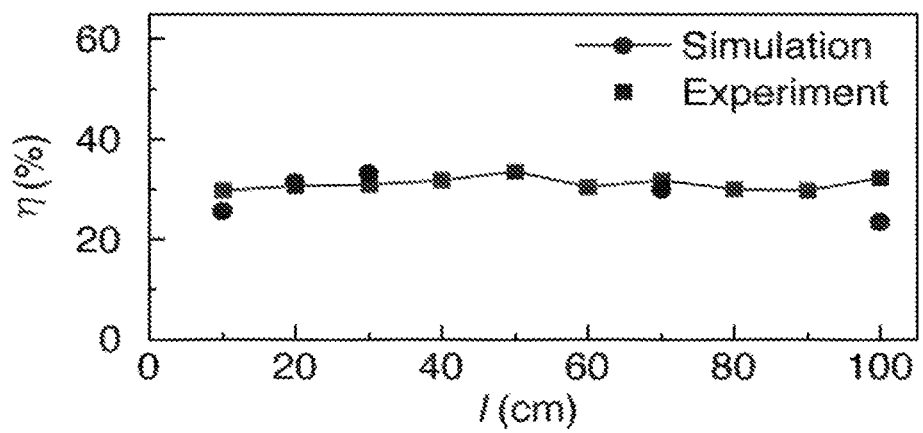
FIG. 3g shows the power transfer efficiency η as a function of length l of relays according to example embodiments. The geometrical parameters are r=1.7 cm, N=10, g=0.1 cm, h=1 cm and w=0 cm.
Figure 3H:
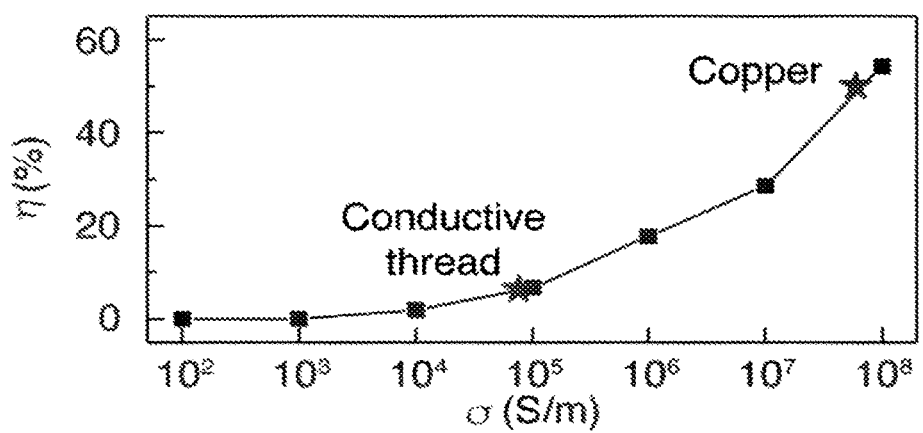
FIG. 3h shows the dependence of power transfer efficiency η on the electrical conductivity a of the near-field relays according to example embodiments. The power is transferred from a wireless reader to a sensor node through a 3-m long near-field relay. The reader and sensor node are respectively placed under the hub and terminal of the relay with 1-cm spacing.

Owing to the long wavelength relative to the length scale of the relays e.g. 302, the configuration can be accurately modeled by the circuit shown in FIG. 3c even when the interconnects between the inductors are meandered or the structure is placed on a nonplanar surface. Following the design procedure, an inductor pattern optimised for interconnecting 3.1-cm diameter reader e.g. 304/sensors e.g. 306 yielded an inductor pattern with radius r=1.7 cm, turn number N=10, and wire gap g=1 mm was implemented (compare optimisation graphs in FIG. 3d-f), followed by interconnecting multiple optimised inductor patterns at an operating frequency of 13.56 MHz. Using conductive thread (silver-plated polyamide yarn with polyurethane (PU) encapsulation in an example embodiment) with conductivity=$7.8\times10^4$ S/m, the near-field relay enables η to be maintained at 30% between length l=10 cm to 1 m (FIG. 3g), although this drops to 6.3% when l=3 m caused by ohmic losses in the thread and transmission line effects (FIG. 3h). By using, for example, highly conductive copper wire, the efficiency can be enhanced up to 50% in different embodiments.

Figure 4:
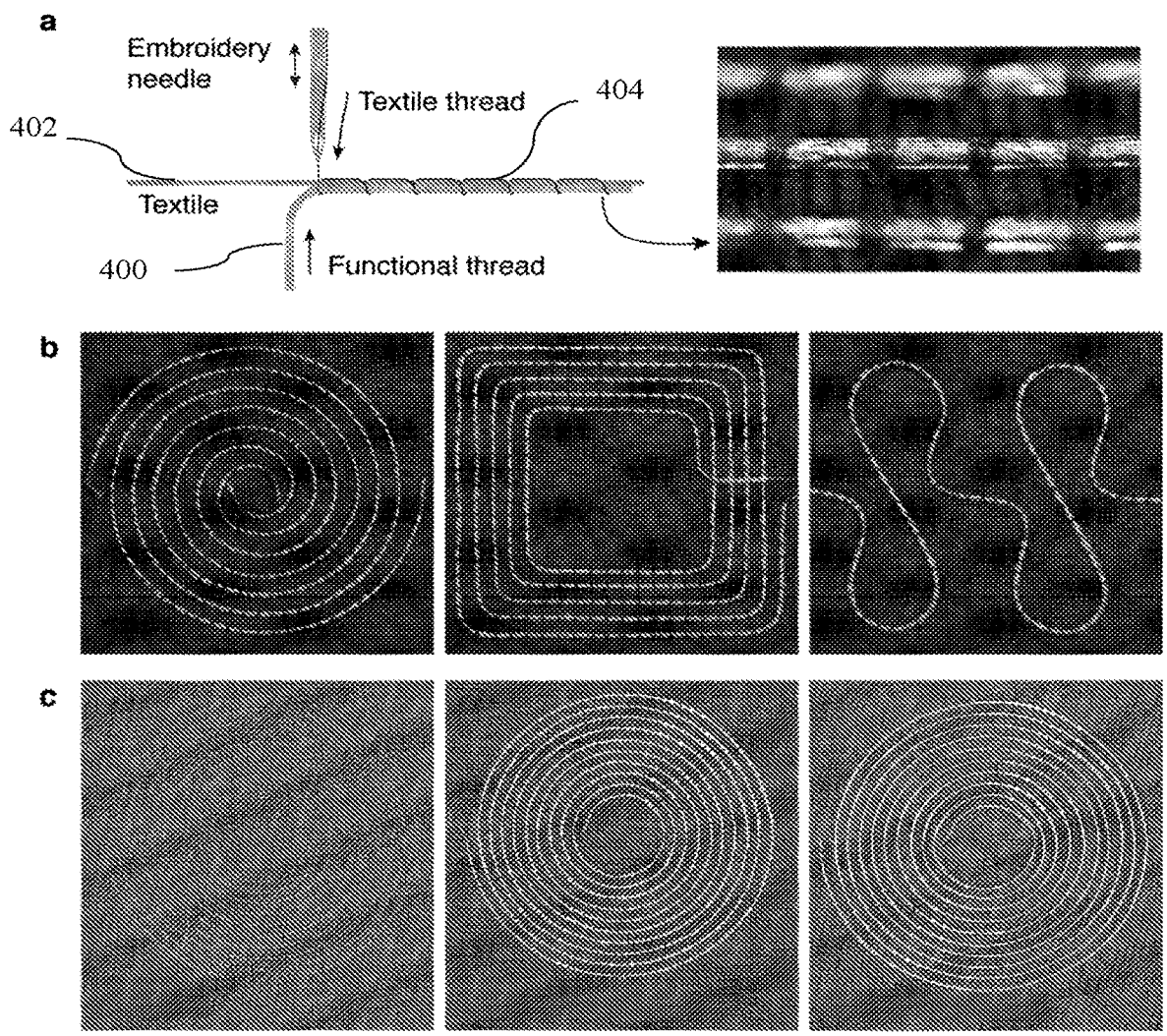
FIG. 4a shows an illustration of an embroidery fabrication process of functional patterns for relays according to example embodiments. The functional conductive threads are fixed on textile by a textile thread.
FIG. 4b shows photographs of different patterns that an embroidery machine can integrate, such as an Archimedes spiral coil (left), a rectangular spiral coil (middle) and a serpentine structure (right).
FIG. 4c shows the same pattern embroidered using different kinds of functional conductive threads, such as copper wire (AWG32, left), Ag plated textile threat with PU encapsulation (600 um outer diameter, middle) and custom Galinstan tubing (600 um outer diameter, right), according example embodiment.

Near-field-enabled clothing according to example embodiments were fabricated using computer-controlled embroidery to integrate the functional thread on clothing with programmable patterns (FIG. 4a). The functional conductive thread 400 is loaded as lower thread and fixed on textile 402 by convectional thread 404. Various kinds of functional pattern, such as Archimedes spiral coil, rectangle spiral coil and serpentine structure (FIG. 4b), can be designed by computer-aided design software, followed by converting to embroidery-compatible file using the specific software and automatically embroidering on textile (FIG. 4c). Multiple kinds of functional conductive wires can be embroidered, such as bare metal (e.g. Cu) wire, metal (e.g. Ag) plated polyamide yarn with polyurethane (PU) encapsulation, and a custom developed conductive thread according to an example embodiment, which will be described in more detail in the following.

Figure 5:
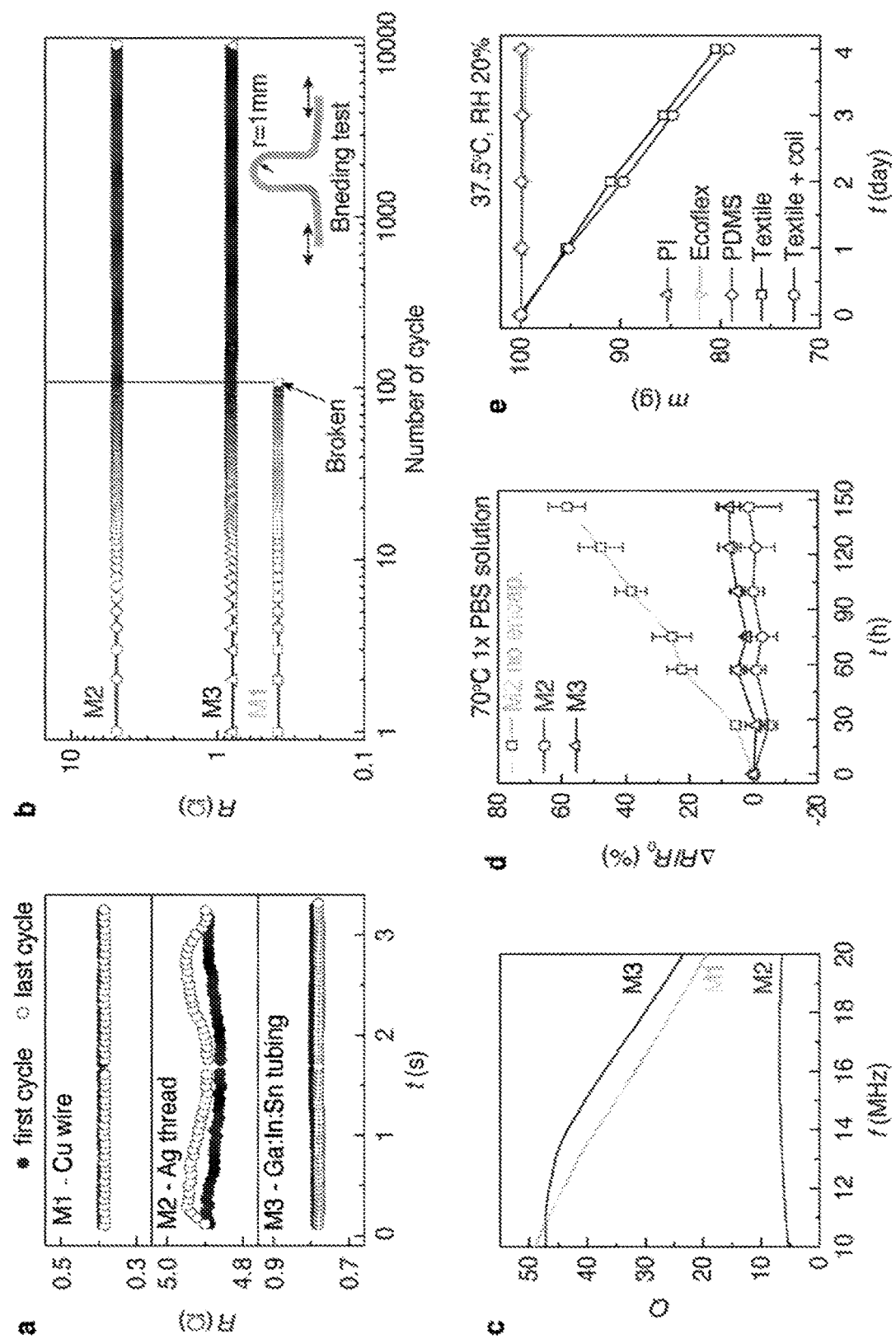
FIG. 5a shows the electrical resistance R response of bare copper wire, Ag plated textile threat with PU encapsulation, and custom Galinstan tubing, to first and last bending cycle (minimum radius 1 mm).
FIG. 5b shows the variation of R against bending cycle of bare copper wire, Ag plated textile threat with PU encapsulation, and custom Galinstan tubing.
FIG. 5c shows the quality factor of three coils fabricated in three kinds material, namely bare copper wire, Ag plated textile threat with PU encapsulation, and custom Galinstan tubing. The coils share same dimension, 6 cm diameter, 1.5 mm pitch, and 13 turns.
FIG. 5d shows the relative change of resistance $\Delta R/R_o$ of three kinds of functional conductive threats, namely bare copper wire, Ag plated textile threat with PU encapsulation, and custom Galinstan tubing, immersed in 70° C. 1× phosphate-buffered saline solution.
FIG. 5e shows the time-dependence of water weight m remained inside bottles sealed by PI film (12 um thickness), Ecoflex sheet (500 um), PDMS sheet (500 um), polyester-spandex textile and textile embroidery with custom Galinstan tubing. The bottles are placed in a chamber with 37.5° C. and 20% relative humidity.
Figure 6:
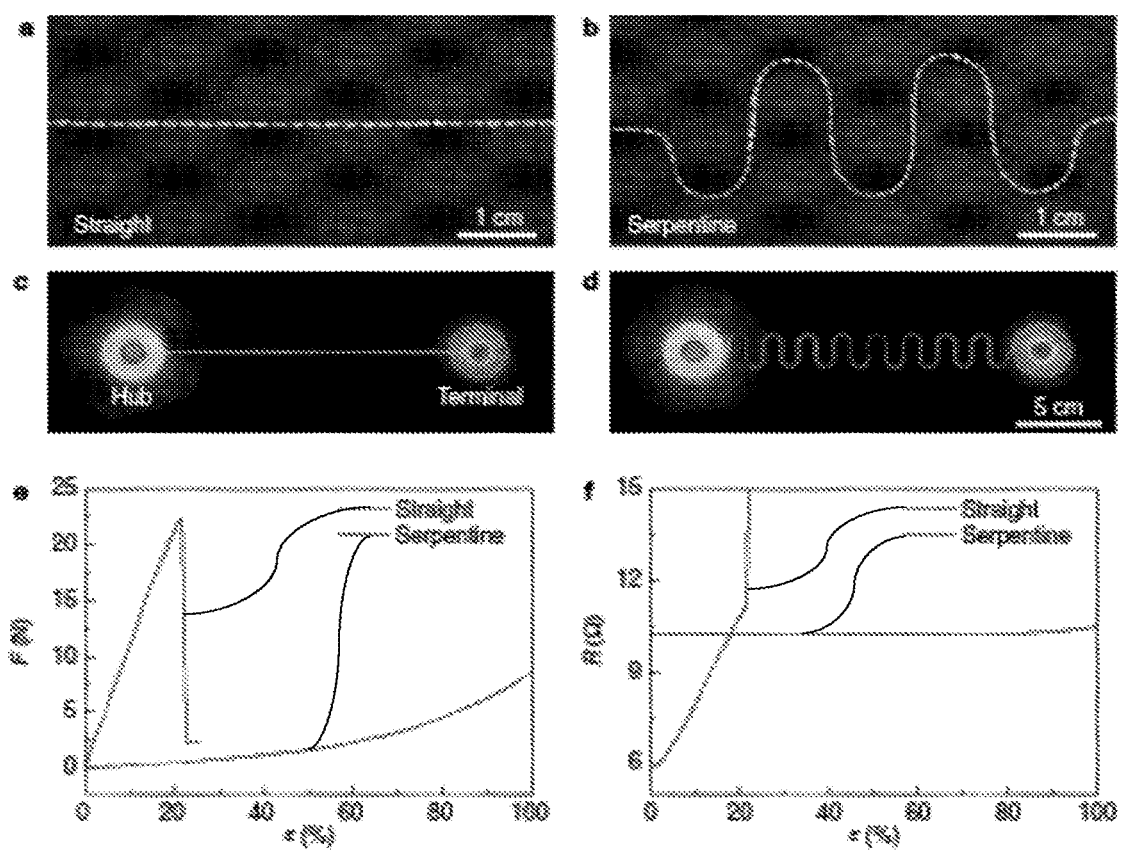
FIG. 6a shows an image of a straight structure of custom Galinstan tubing.
FIG. 6b shows a serpentine structure of custom Galinstan tubing.
FIG. 6c shows the normalised magnetic field amplitude $|H_{abs}|$ above a relay according to an example embodiment with a straight interconnect.
FIG. 6d shows the normalised magnetic field amplitude $|H_{abs}|$ above a relay according to an example embodiment with serpentine interconnects.
FIG. 6e shows the dependence of pulling force F and electrical resistance R (f) on strain $\varepsilon$ of a relay according to an example embodiment with a straight interconnect.
FIG. 6f shows the dependence of pulling force F and electrical resistance R (f) on strain $\varepsilon$ of a relay according to an example embodiment with a serpentine interconnect.

The custom conductive tubing according to an example embodiment of the present invention is provided for the near-field enabled clothing with high performance and daily usage, and is capable of being embroidered on a textile, i.e. embroidery-compatible. Embroidery-compatible here means that the tubing is capable of being embroidered on textile such as clothing, with the strength of the tubing sufficient so that the tubing will preferably not be broken or stretched during embroidery. The tubing embroidery-compatible is depending on both Young's modulus and tubing diameter, a suitable range is >250 MPa and <700 μm, respectively. Non-limiting examples of suitable tubing include Perfluoroalkoxy tubing and Polytetrafluoroethylene, PTFE, tubing. The custom developed conductive tubing in one example embodiment is fabricated by filling Perfluoroalkoxy tubing with Galinstan. The custom conductive tubing according to this example embodiments is also referred to as Galinston tubing herein. The Perfluoroalkoxy tubing is selected since it has high Young's modulus and flexibility to be compatible with embroidery machine without causing tubing stretching or breakage during embroidery. Galinstan is in liquid state at room temperature, which can accustom to any kinds of deformation. As shown in FIG. 5a,b, bare Cu wire ("M1"—AWG32, ~202 um diameter), Ag plated textile thread with PU encapsulation ("M2" ~250 um inner diameter), and Galinstan tubing (M3—~305 um inner diameter) underwent bending test with minimum radius of 1 mm up to 10000 cycles. The bare Cu wire breaks at around 100 cycles due to its low Yield strain (~0.5%) while other two conductive threads maintain stable resistance during the whole testing, indicating their potential for long-term wearable usage. FIG. 5c compares quality factor of three coils (6 cm in diameter, 1.5 mm pitch, 13 turns) fabricated using the different conductive threads, i.e. bare Cu wire, Ag plated polyamide yarn with PU encapsulation, and Galinstan tubing, respectively, at the frequency range of 10 MHz to 20 MHz. The Galinstan tubing has both high conductivity (DC conductivity $3.46\times10^6$ S/cm) and large size to achieve maximum quality factor, Q=45 at 13.56 MHz, which is much higher than that of the conductive thread, Q=5 at 13.56 MHz. To investigate the long-term stability on contacting with human sweat, different conductive threads were immersed in 70° C. 1× phosphate-buffered saline solution. FIG. 5d shows that both Ag plated polyamide yarn with PU encapsulation and Galinstan tubing maintain stable electrical conductivity while a Ag plated polyamide yarn without PU encapsulation "M2 no encapsulation") gradually loses electrical conductivity, mainly because of oxidation of the plated Ag. Direct embroidery of the Galinstan tubing on textile didn't change the textile's gas permeability (FIG. 5e), thus maintaining wearable comfortability. In FIG. 5e, the plots for Polyimide (PI), Ecoflex, PDMS overlap. As comparison, conventional methods of filling Galinstan in microfluidic channel (PDMS or Ecoflex matrix) or depositing copper on flexible polyimide film significantly block gas permeability. It is noted that while the conductive thread according to an example embodiment is only slightly stretchable, patterns with serpentine design achieve 100% stretchability while maintaining the same transmission efficiency (FIG. 6).

Figure 7:
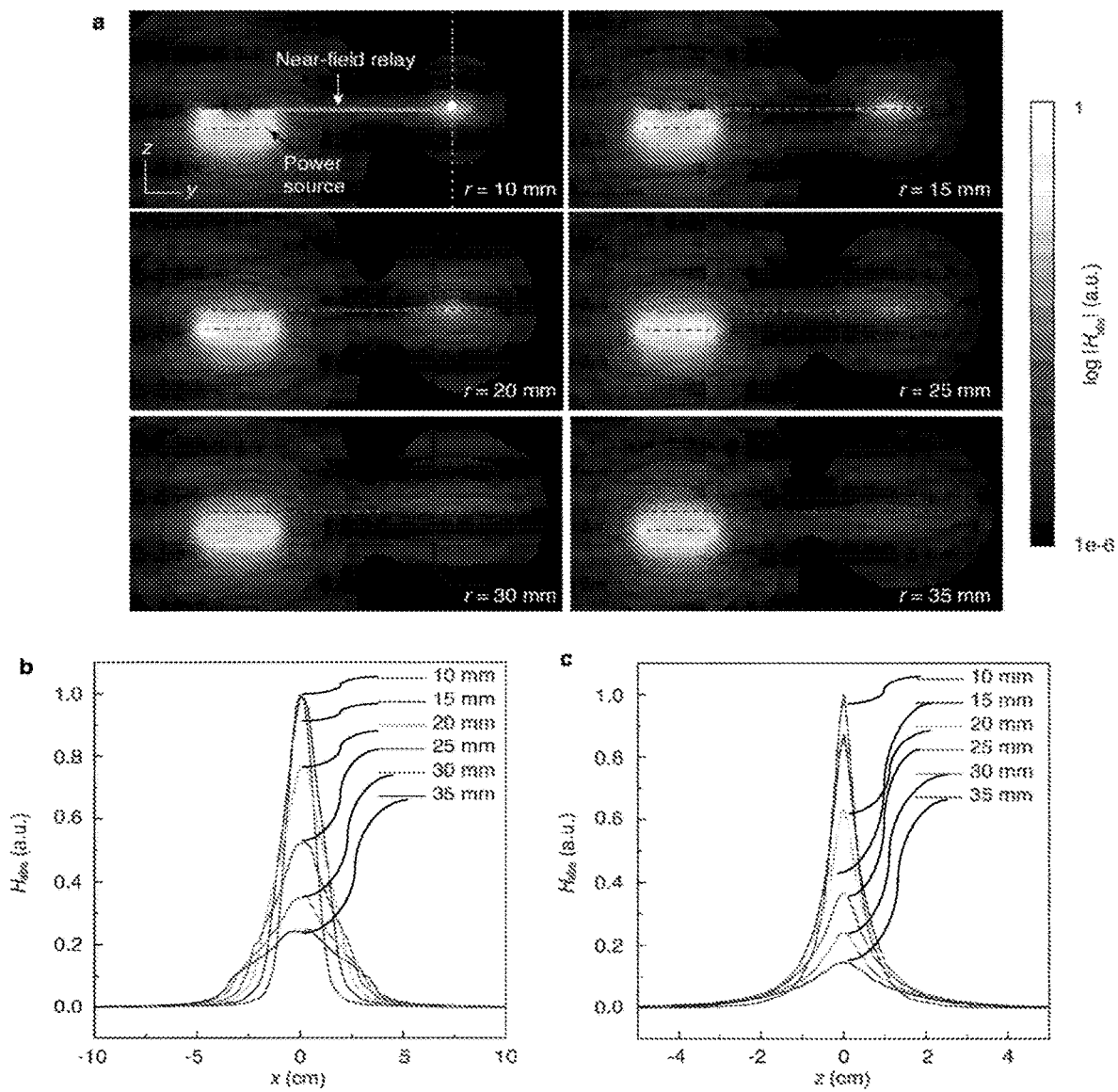
FIG. 7a shows the normalized magnetic field distribution $|H_{abs}|$ with varying terminal radius r of near-field relays according to example embodiments. The terminals maintain constant inner radius (2 mm) and wire gap (1 mm).
FIG. 7b shows the field profile along x direction (white dotted line in FIG. 7a).
FIG. 7c shows the field profile along direction (white dashed line in FIG. 7a).
Figure 8:
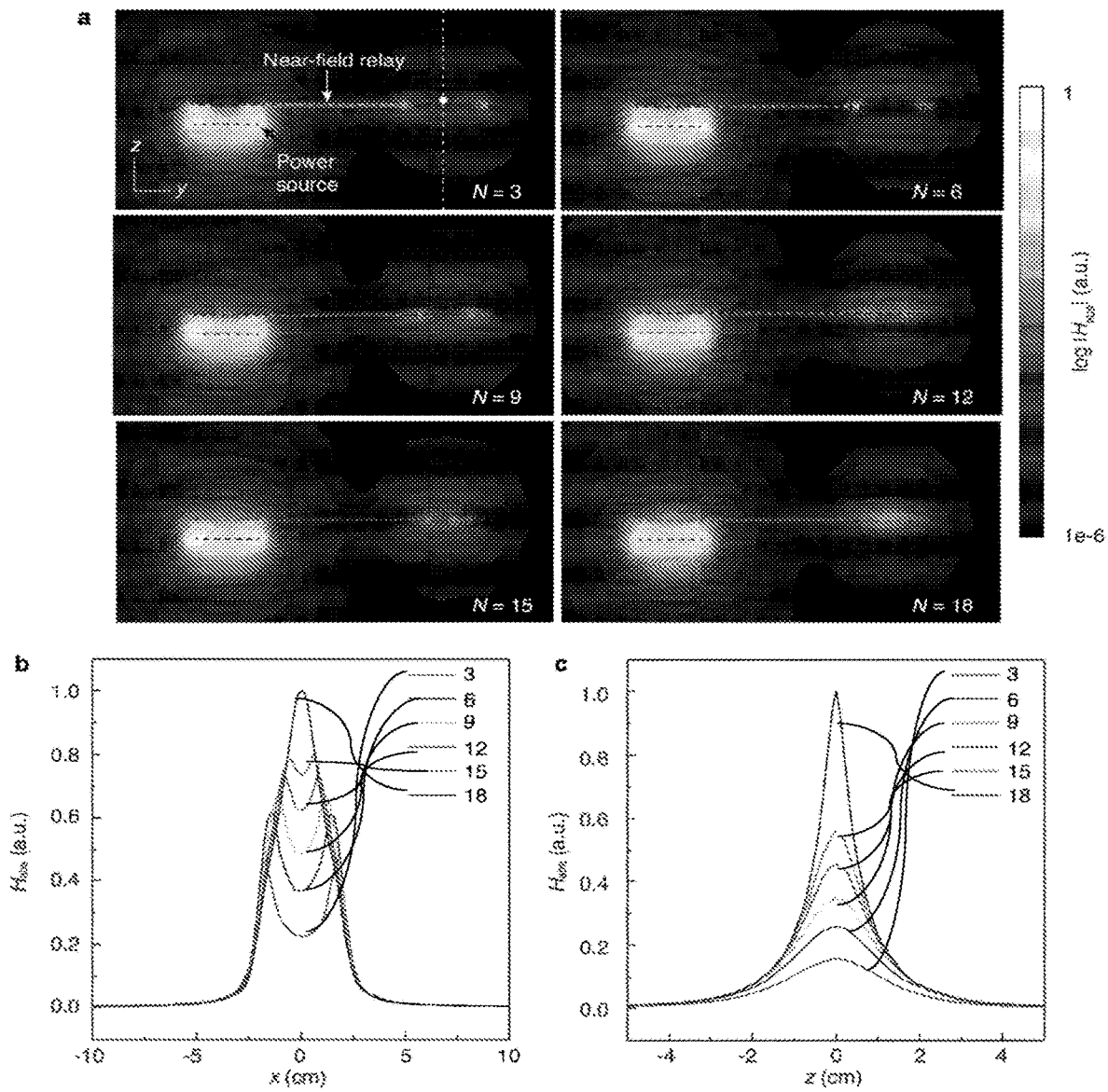
FIG. 8a shows the normalized magnetic field distribution $|H_{abs}|$ with varying terminal turn number N of near-field relays according to example embodiments. The terminals maintain constant outer radius (20 mm) and wire gap (1 mm).
FIG. 8b shows the field profile along x direction (white dotted line in FIG. 7a).
FIG. 8c shows the field profile along direction (white dashed line in FIG. 7a).
Figure 9:
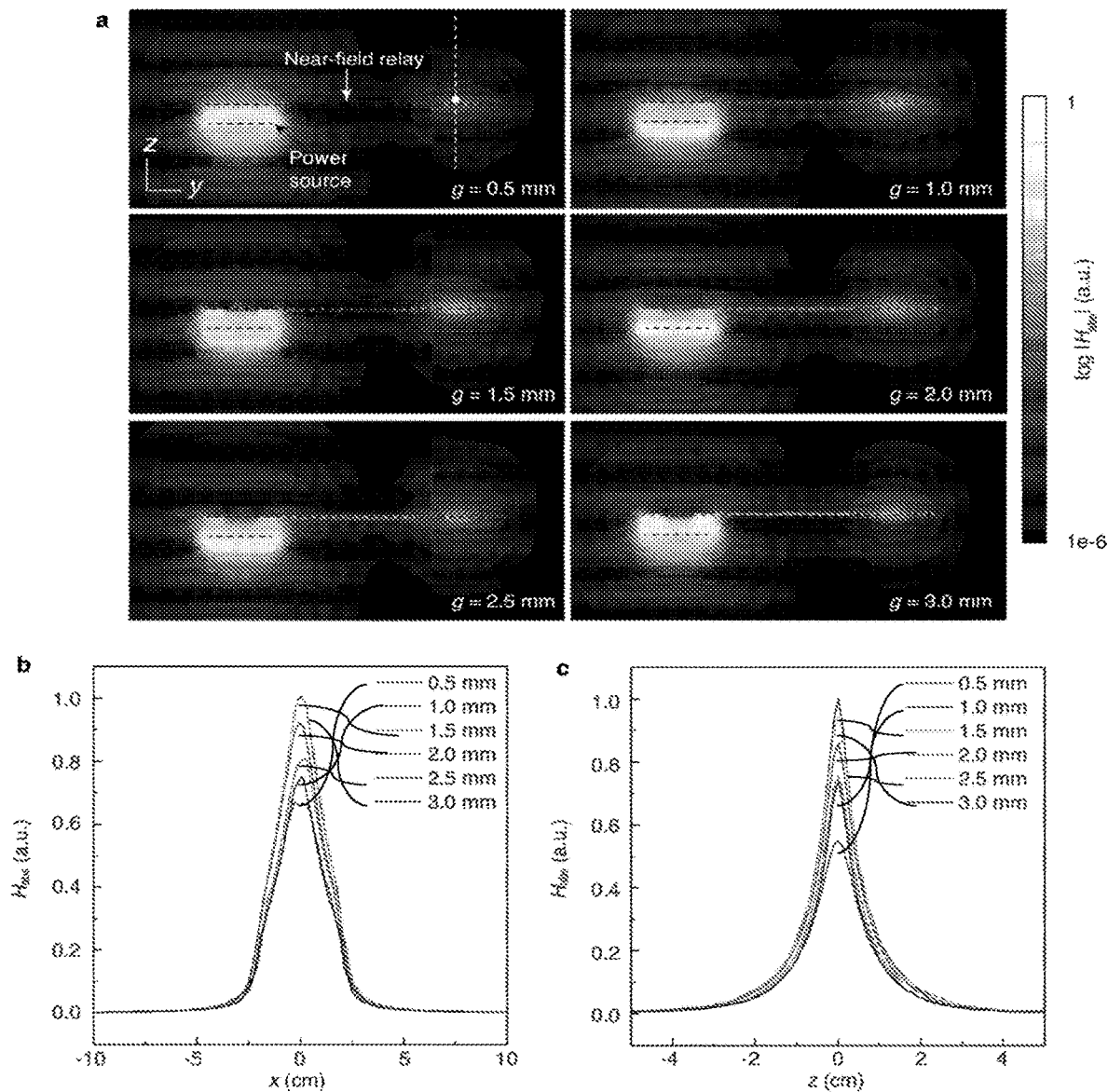
FIG. 9a shows the normalized magnetic field distribution $|H_{abs}|$ with varying wire gap g of near-field relays according to example embodiments. The terminals maintain constant outer radius (20 mm) and inner radius (2 mm).
FIG. 9b shows the field profile along x direction (white dotted line in FIG. 7a).
FIG. 9c shows the field profile along direction (white dashed line in FIG. 7a).
Figure 10:
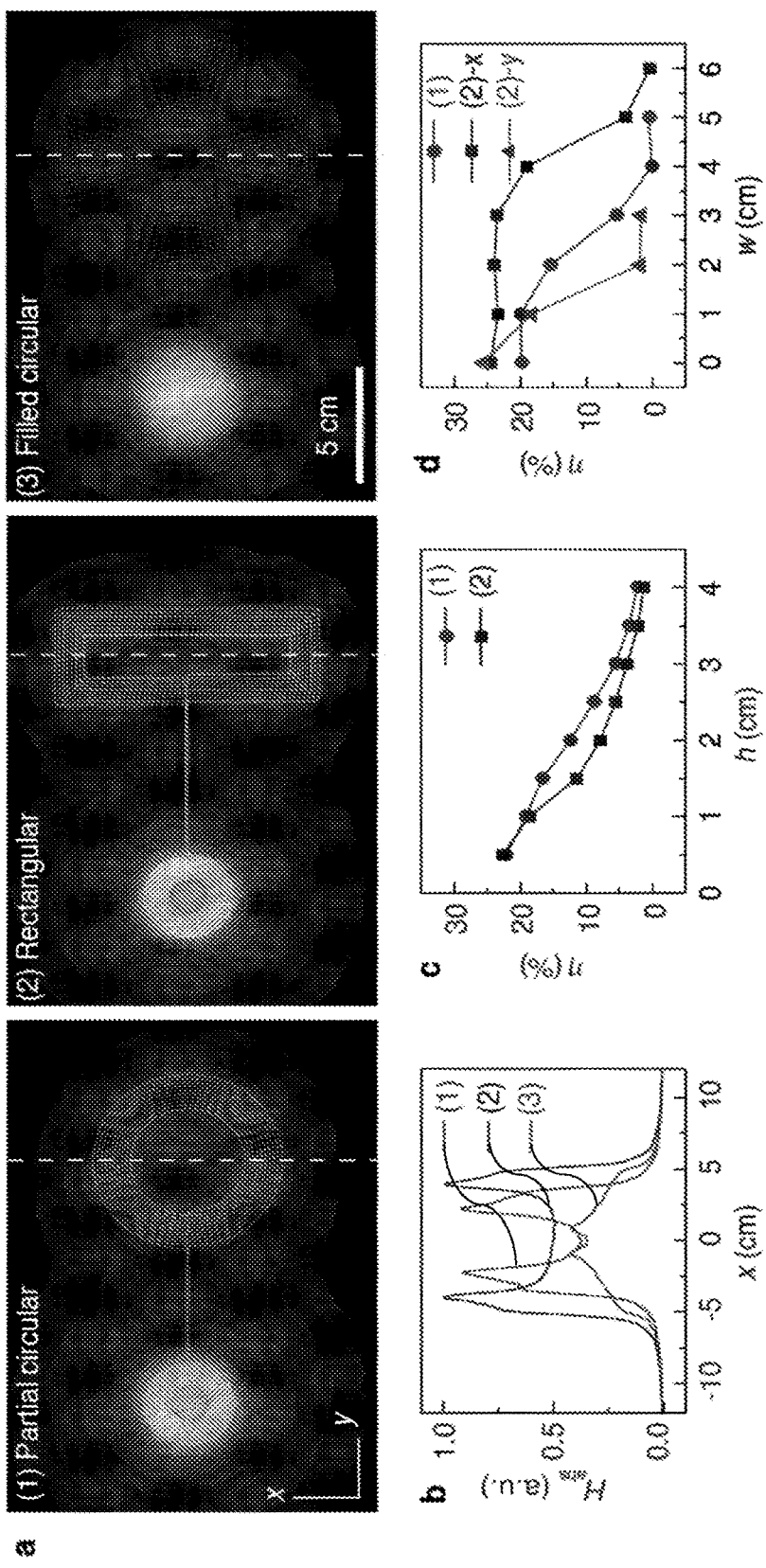

Near-field relays according to example embodiments can be tailored to mitigate the sensitivity of NFC connections to the orientation and alignment of the sensor. By varying the inductor patterns, the magnetic field distribution can be controlled to achieve an operational area and/or working distance not achievable by the reader/sensor pair alone. Full-wave simulations show that increasing the radius r while changing the number of turns N and the wire gap g allows sensors to operate over an increased 5-cm diameter region according to various example embodiments (FIG. 7-9). FIG. 10 show the magnetic field distribution of representative inductor designs optimised for vertical range h (partial circular, FIGS. 10a(1) and b), directional displacement w (rectangular, FIGS. 10a(2) and c), or operational area (filled circular, FIGS. 10a(3) and c).

Figure 11:
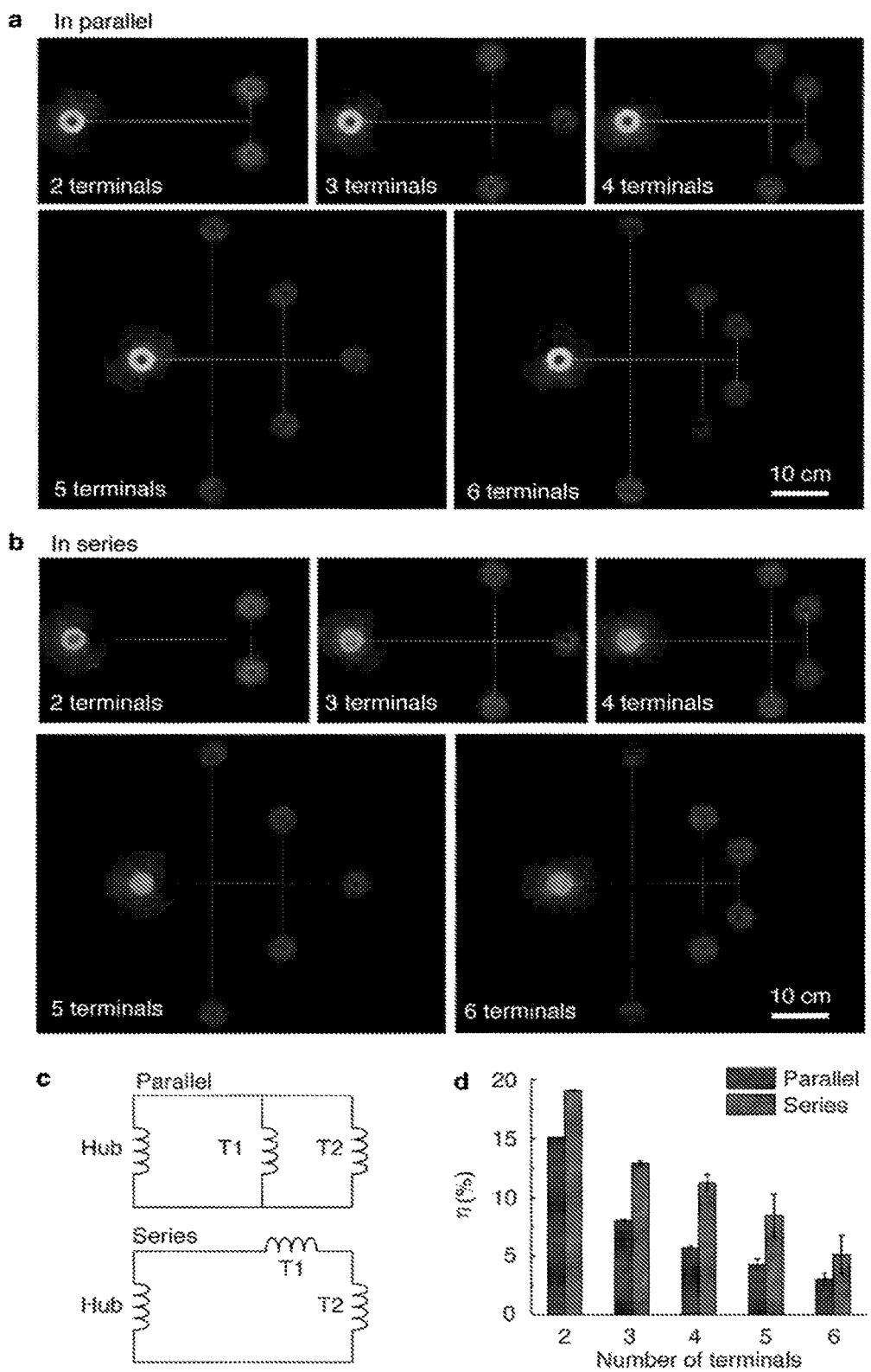
FIG. 11a shows the magnetic field above relays according to example embodiments with multiple terminals connected in parallel. l=30 cm between the hub and each terminal. Power source/sensor node is placed on the hub/terminal with 1-cm spacing.
FIG. 11b shows the magnetic field above relays according to example embodiments with multiple terminals connected in series (b). l=30 cm between the hub and each terminal. Power source/sensor node is placed on the hub/terminal with 1-cm spacing.
FIG. 11c shows the circuit models for 2 terminals near-field relay according to example embodiments connected in parallel (up panel) and in series (bottom panel).
FIG. 11d shows the power transfer efficiency η to a terminal as a function of the total number of terminals connected either in parallel or in series in relays according to example embodiments.

Simultaneous readout of multiple sensors can also be achieved using near-field relays with multiple inductor patterns, according to example embodiments. When interconnected either in series or parallel (FIG. 11a-c), excitation of a single terminal by a reader results in the creation of multiple magnetic hotspots that can enable multi-nodal sensor function using existing NFC multiplexing protocols understood in the art. The transfer efficiency is inversely proportional to the number of sensors due to the distribution of energy over multiple terminal points (FIG. 11d). Although series interconnection maintains constant current through all the inductors and higher efficiencies, parallel interconnection is more robust and can maintain function even if one (or more) inductor patterns are disconnected.

Figure 12:
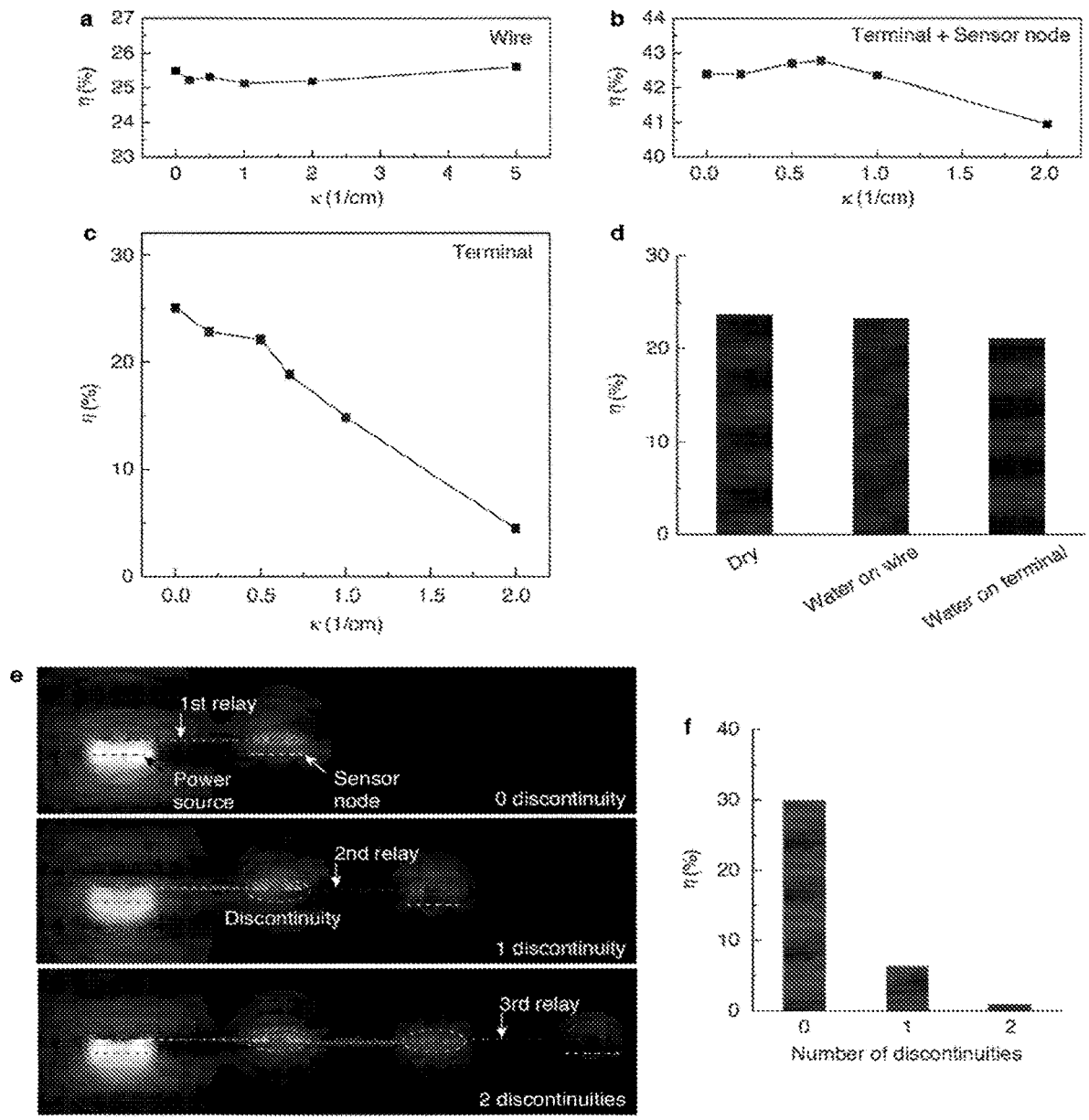
FIG. 12a shows the dependence of power transfer efficiency η on the bending curvature for bending the interconnecting wire of a relay according to an example embodiment. The minimum spacing between the sensor node and the terminal is 1 cm.
FIG. 12b shows the dependence of power transfer efficiency η on the bending curvature for bending both the terminal of a relay according to an example embodiment and the sensor node. The sensor node is attached to the terminal when bending both of them simultaneously.
FIG. 12c shows the dependence of power transfer efficiency η on the bending curvature for bending only the terminal of a relay according to an example embodiment. The minimum spacing between the sensor node and the terminal is 1 cm.
FIG. 12d shows the dependence of η on water splashing for a relay according to an example embodiment.
FIG. 12e shows the normalized magnetic field distribution $|H_{abs}|$ across discontinuities, with the spacing between neighboring relays being 2 mm.
FIG. 12f shows the dependence of power transfer efficiency η on the number of discontinuities between the neighboring relays of FIG. 12e.

Near-field relays according to example embodiment are also highly robust to deformation and wetting. When the relay is placed conformally to a curved surface, the efficiency varies by less than 2% with the interconnecting wires (or both inductor and sensor node) subjected to surface with 2-mm (5-mm) radius, while the efficiency is reduced by 20% with only the inductor pattern subjected to surface with 2-mm radius due to redistribution of the magnetic field (FIG. 12a-c). Wetting of either the inductor patterns or the interconnecting wires results in less than 3% change in efficiency, indicating the robustness of the wireless connection against weather or sweat (FIG. 12d). Two near-field relays can also be wirelessly interconnected by placing their inductor patterns in close proximity (FIG. 12e,f), which could be exploited to transmit energy and data between different articles of clothing, for example between shirt and pants. It is noted that the magnetic fields at terminal of the second relay and hub of the third relay are merged together, but they are physically separated.

Figure 13:
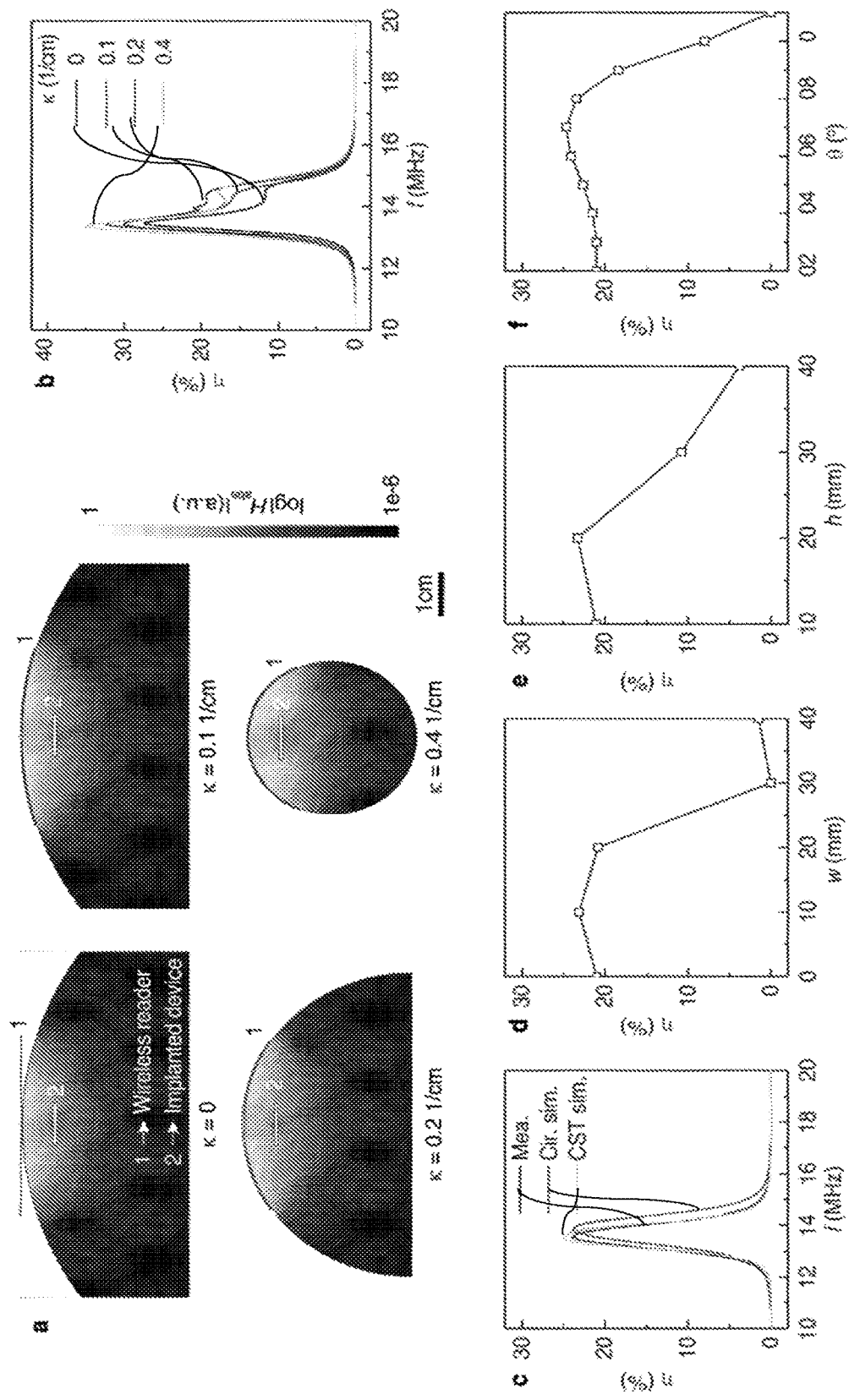
FIG. 13a shows the normalised magnetic field $|H_{abs}|$ distribution of a terminal inductor of a relay according to an example embodiment as reader to a implanted device through tissue phantom with curvature κ 0, 0.1, 0.2 and 0.4 l/cm. The reader diameter is 6 cm, the square implanted device has 1 cm in length, and gap h=1 cm.
FIG. 13b shows the simulated power transfer efficiency η for the four conditions shown in FIG. 13a, the impedance is matched at 13.56 MHz.
FIG. 13c shows a comparison of power transfer efficiency η obtained from experimental measurement, circuit simulation, and CST simulation. The configuration is shown in FIG. 13a with κ=0 l/cm.
FIG. 13d shows the dependence of η on misalignment w.
FIG. 13e shows the dependence of η on gap h.
FIG. 13f shows the dependence of η on relative rotation angle θ.

Near-field enabled clothing according to example embodiments can be well conformal on human skin to wirelessly and robustly power implanted devices. In an example embodiment, a wearable wireless powering system comprising a textile attachable powering source with a battery and a flexible print circuit board, and a near-field enabled clothing with one inductor pattern can be provided. The inductor pattern can be electrically connected to the powering source, e.g. by snap-on buttons The near-field enabled clothing fabricated from flexible conductive Galinstan tubing according to an example embodiment can be well conformal on curved surface. With reference to FIG. 13a, all-wave simulation shows that magnetic field generated from the inductor pattern 1 (battery and a flexible print circuit board not shown in the simulation results in FIG. 13a), functioning as reader, can be transmitted to an implanted device 2, and powering transfer efficiency at 13.56 MHz increases with curvature of a tissue phantom ranging from 0 to 0.4 l/cm (FIG. 13b), the tissue phantom of the simulations mimicking the human body. Experimental measurement, circuit simulation and CST simulation show consistent power transfer efficiency of the wearable wireless powering system with impedance matching at 13.56 MHz (FIG. 13c). CST simulation is further used to investigate the working range of the system by varying the relative position of relay inductor pattern, functioning as reader, and sensor, including planar misalignment, vertical gap, and rotating angle (FIG. 13e-f).

Multi-Node Spinal Posture Monitoring According to an Example Embodiment

Figure 14:
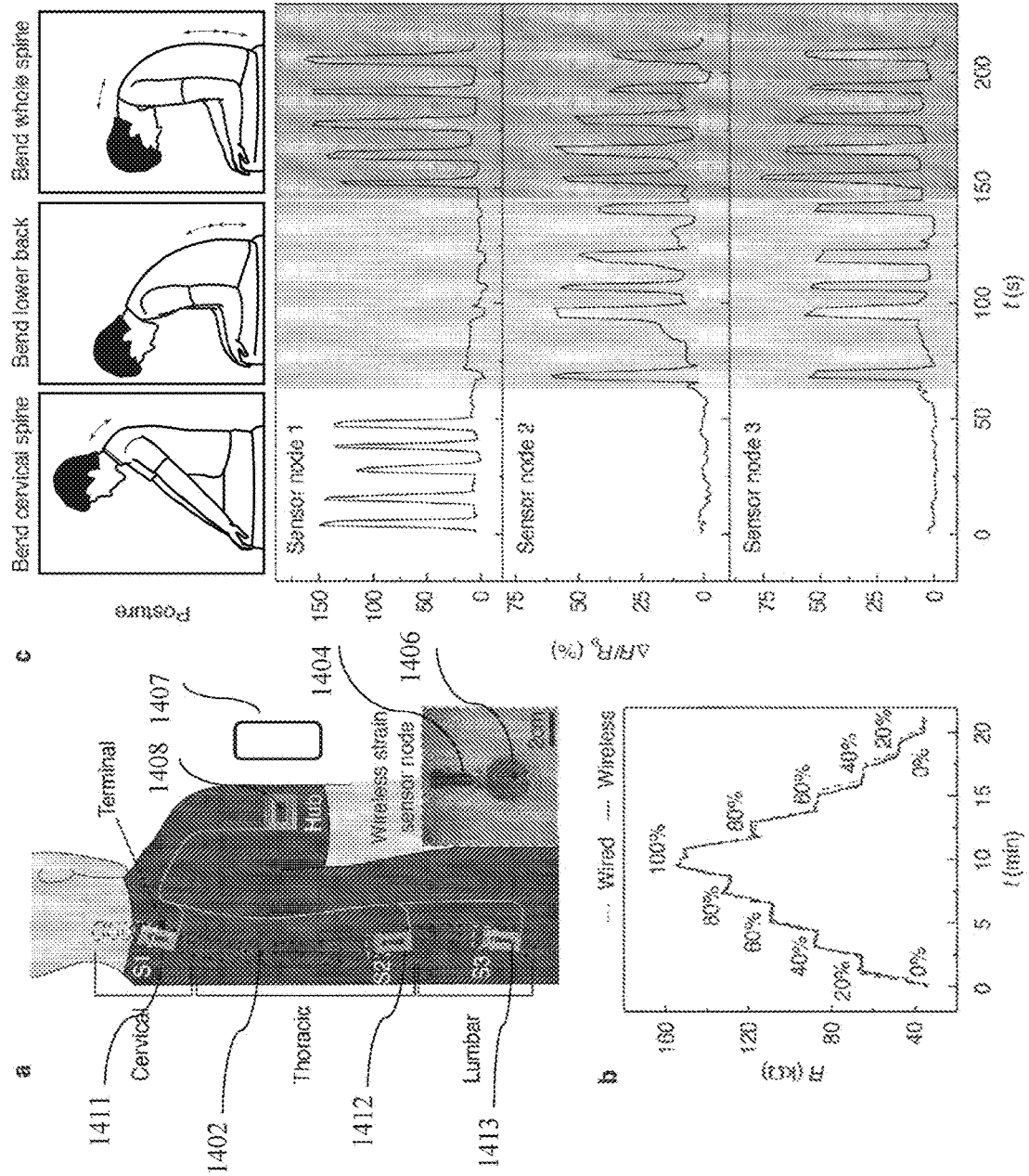
FIG. 14a shows a schematic illustration of a wireless sensor system according to an example embodiment for real-time posture monitoring, with battery-free strain sensors mounted on cervical (S1), thoracic (S2), and lumbar (S3) sections being simultaneously interconnected to an NFC hub device via the near-field-enabled clothing.
FIG. 14b shows the strain sensor resistance measured directly through wired connection and wirelessly through NFC, according to an example embodiment, as the strain is cycled from 0 to 100%.
FIG. 14c shows the sensor data acquired during human subject motion. The subject sequentially bends the cervical spine, lower back and whole spine, repeating each motion five times.

Real-time monitoring of spinal posture outside of clinical or laboratory settings has important applications in the diagnosis and treatment of musculoskeletal disorders such as neck and back pain, radiculopathy, and sensorimotor deficit. Continuous sensing of spinal posture by interconnecting multiple battery-free strain sensors e.g. S1 distributed along the cervical, thoracic, and lumbar sections of the spine with a near-field-enabled clothing, here a shirt 1402, according to an example embodiment will now be described (FIG. 14a). Each skin-mountable sensor e.g. 1400 combines a commercial NFC chip set 1404 with a custom resistive elastomeric strain gauge 1406, which exhibits up to 100% strain and a gauge factor of 3 (FIG. 14b). A multi-node near-field relay according to an example embodiment embroidered on the polyester-spandex shirt 1402 wirelessly interconnects the sensors S1-S3 to an NFC reader 1407 worn on the right arm secured by a strap (not shown) above the relay hub 1408. The near-field relay incorporates rectangular spiral inductor patterns for the terminals 1411-1413 for robustness against vertical displacement of the sensors S1-S3 relative to the clothing layer. A rectangular spiral inductor pattern is also used for the hub 1408.

FIG. 14c shows continuous strain measurements acquired by the sensor S1-S3 (i.e. nodes 1-3) network at 1 Hz sampling rate during physiological motions. Simultaneous data acquisition from the sensors S1-S3 enabled three distinct motions to be distinguished: (i) neck motion results in a relative resistance change AR/Ito (maximum 150%) for S1 but not S2 or S3, (ii) lower back motion results in signals for S2 and S3 (maximum 60%) but not S1, and (iii) whole spine motion results in signals for all three sensors. Consistent recording across five repetitions of each motion (10 s duration) demonstrates the reliability of the wireless connection. This distributed and continuous mode of sensing enables real-time feedback to correct improper posture without requiring close proximity to the wireless reader.

The near-field-enabled clothing according to example embodiments can provide high-fidelity monitoring from skin-mountable sensors during moderate displacement between the skin/sensor and clothing layer. In this example embodiment, the rectangular inductor design maintains a power transfer efficiency from the reader to the sensor of 23% within a 3-cm displacement of the sensor from the centre-aligned position. Owing to their battery-free operation, each skin-mountable sensor is lightweight (0.3 g) and flexible, reducing the mechanical load on the user. By exploiting the continuous wireless operation of the network, the hub can provide real-time bio-feedback to the subject for posture adjustment, according to example embodiments.

Continuous Exercise Monitoring According to an Example Embodiment

Figure 15A:
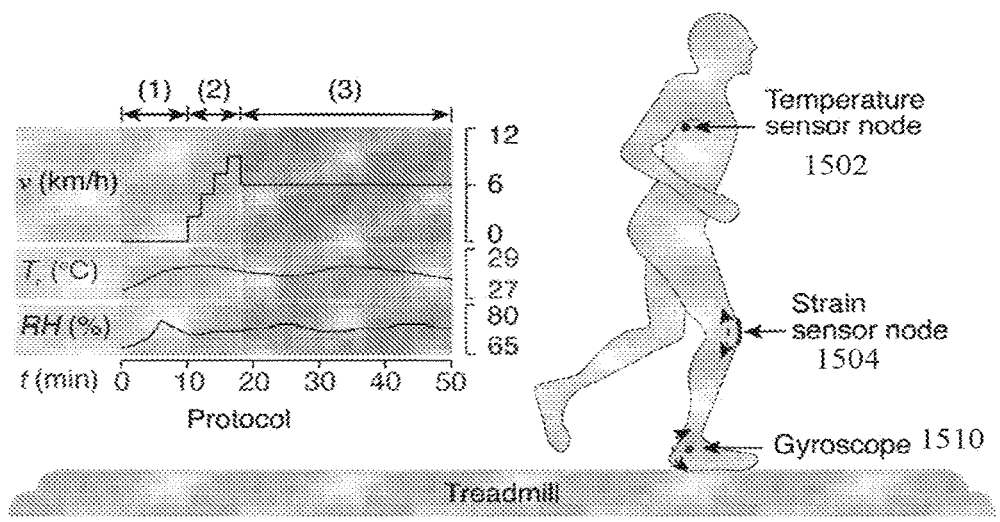
FIG. 15a show a schematic illustration of an experimental protocol and sensor placement according to an example embodiment. The subject performs (1) sitting, (2) walking/running at 2.8, 5, 7.2, and 9 km/h, and (3) walking at 6 km/h in a thermal chamber (28° C., 70% relative humidity). Battery-free sensors provide temperature and strain measurements when interconnected to a smartphone. A gyroscope attached at the ankle is used as reference for gait monitoring.
Figure 15B:
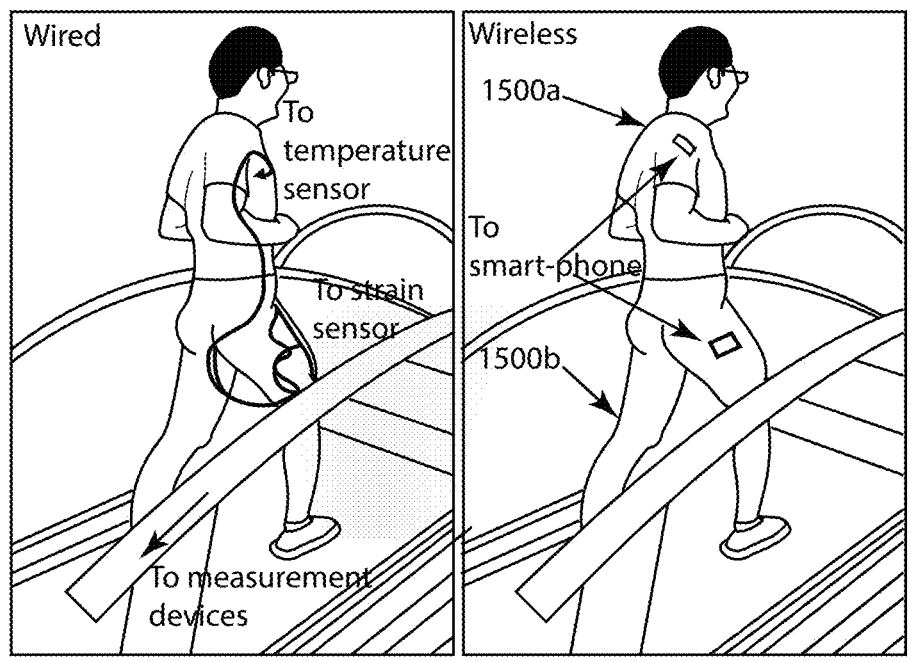
FIG. 15b shows photographs illustrating a comparison of a wired (left) monitoring, and a wireless (right) monitoring system according to an example embodiment.

Wireless battery-free sensors can provide important monitoring capabilities for athletic and health monitoring, but continuous operation of NFC-based devices during exercise has not previously demonstrated, to the best of the inventors' knowledge, due to challenges in maintaining connectivity with the wireless reader. An example embodiment of the present invention overcomes this challenge by the using near-field-enabled clothing 1500a, b according to example embodiments to interconnect NFC-based temperature and strain sensors 1502, 1504 to a smartphone reader during untethered running (FIG. 15a,b). In FIG. 15b, the photo on the left shows a wired system to highlight the obstruction that is caused on the human activity, compared to the wireless system according to an example embodiment, as shown in the photo on the right.

In the embodiment shown in FIG. 15b, a smartphone as reader is worn on the arm or the butt selectively. This is because current smartphones do not generally support multiplex reading of NFC tags. The near-field enabled clothing according to different example embodiments can be designed to have both hubs merged into one, e.g. located at the butt, therefore a single reading device can interact with both sensors simultaneously.

The resulting monitoring system according to an example embodiment enables real-time measurement of axillary temperature, an important marker of health and performance, and running gait, an indicator for exhaustion and certain neurodegenerative diseases, using the temperature sensor 1502 under the armpit and the strain sensor 1504 on the knee, respectively.

Figure 15C:
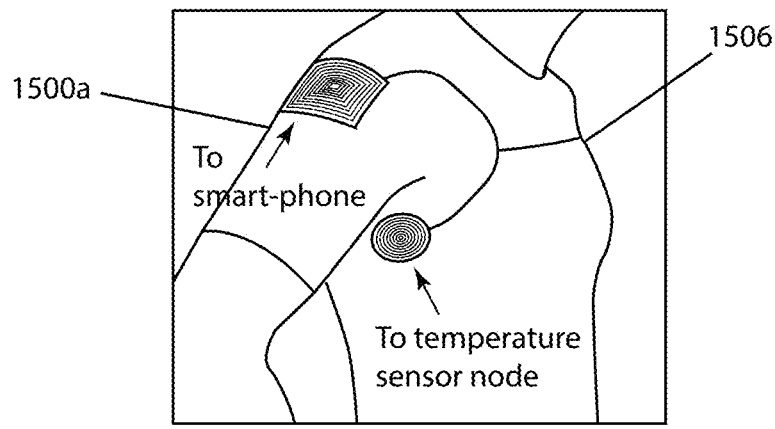
FIG. 15c shows a photograph of a near-field-enabled shirt according to an example embodiment for sensor interconnection.
Figure 15D:
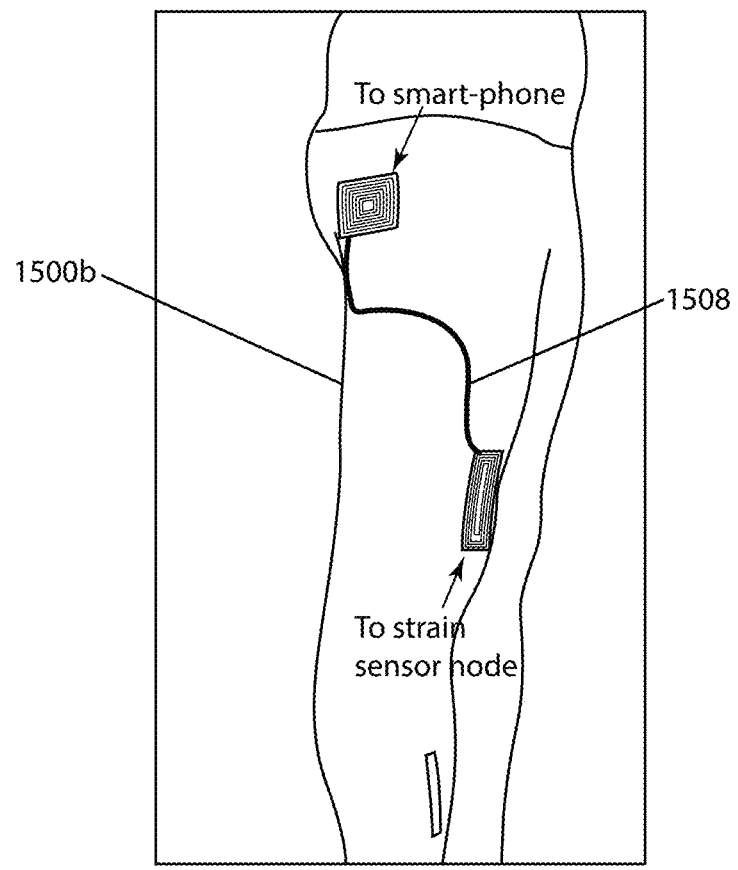
FIG. 15d shows a photograph of near-field-enabled pants according to an example embodiment for sensor interconnection.

Although the sensor nodes are not directly accessible to the reader during physiological motion, continuous connectivity is maintained by near-field relays 1506, 1508 according to example embodiments embroidered on the polyester-spandex shirt 1500a and pants 1500b (FIG. 15c,d).

Figure 15E:
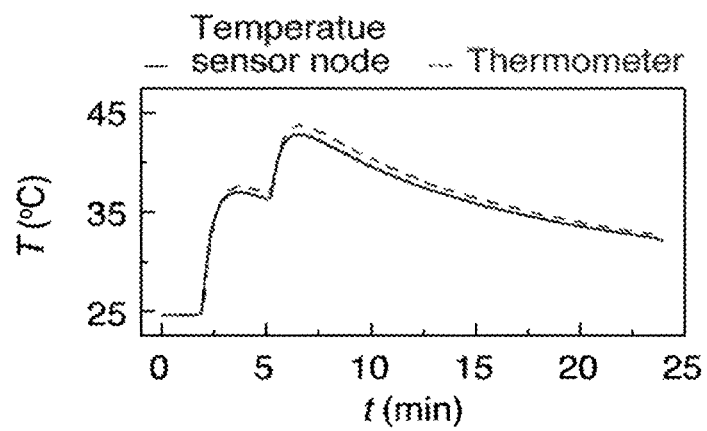
FIG. 15e shows battery-free temperature sensor node calibration data according to an example embodiment compared to wired thermocouple.
Figure 15F:
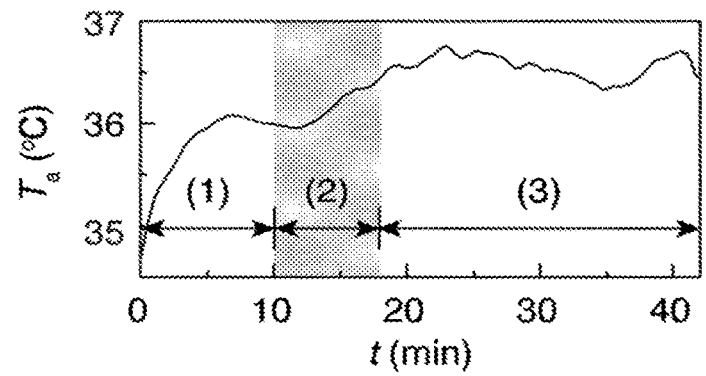
FIG. 15f shows axillary temperature recorded by the smartphone during the exercise protocol according to an example embodiment.

The battery-free temperature sensor 1502 is used to measure the axillary temperature. Calibration measurements with a wired thermocouple 1510 (FIG. 15b) show close agreement with the temperature sensor 1502 (FIG. 15e). FIG. 15f shows temperature measurements from a healthy subject from the temperature sensor 1502 during (1) acclimatisation from indoor to outdoor tropical climate (28° C., 70% relative humidity) in a thermal chamber, (2) walking on a treadmill with stepwise increase in speed, and (3) walking on the treadmill at constant speed (FIG. 15a). As expected, the sensor detected a rapid 1.5° C. increase in axillary temperature over 6 min of the acclimatisation phase, followed by a slow 0.5° C. increase during walking, attributed to an increase in skin blood flow during physiological activity. Walking at a constant speed resulted in small (<0.5° C.) fluctuations in body temperature caused by perspiration and evaporative cooling. Data were acquired in real-time at a 4 Hz sampling rate without any loss of connectivity over the 40-min duration of the protocol, despite wetting of the clothing 1500a, b due to perspiration. This continuous mode of temperature monitoring according to an example embodiment could enable detection of exertional heat stress during athletic activity, military carriage, and other environments unsuited for conventional monitoring technologies (such as infrared imaging).

Figure 15G:
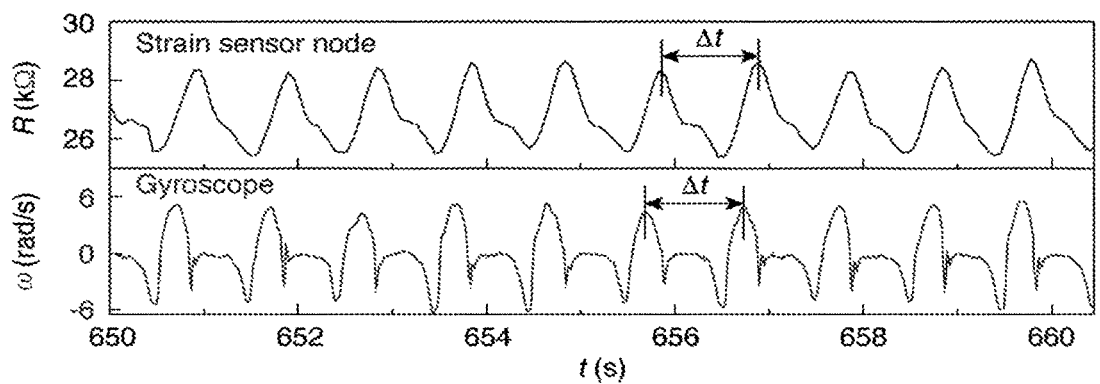
FIG. 15g shows representative strain sensor (top, according to an example embodiment) and gyroscope (bottom, reference) measurements during walking at 2.8 km/h. Δt, stride time given by the peak-to-peak interval.
Figure 15H:
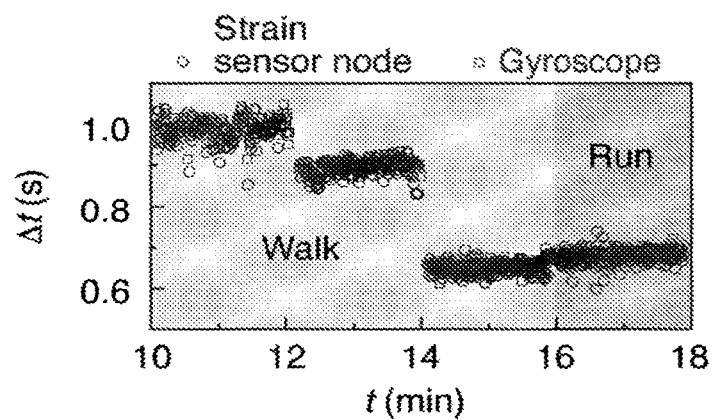
FIG. 15h shows Δt measured by the strain sensor node according to an example embodiment, and the gyroscope (reference) during phase (2) of the experimental protocol.
Figure 15I:
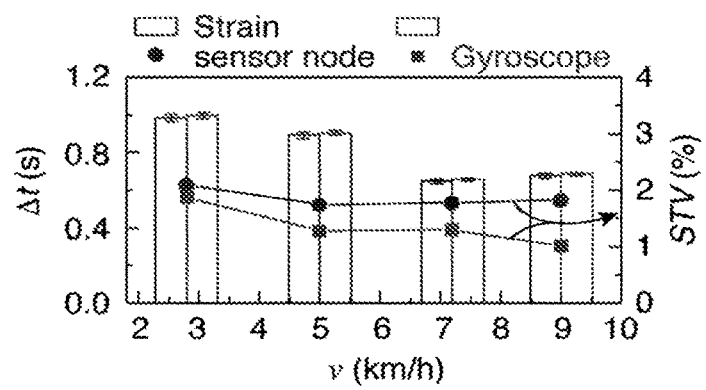
FIG. 15i shows a comparison of Δt and stride time variability (STV) acquired by the strain sensor node according to an example embodiment and the gyroscope (reference) as a function of speed v.
Figure 15J:
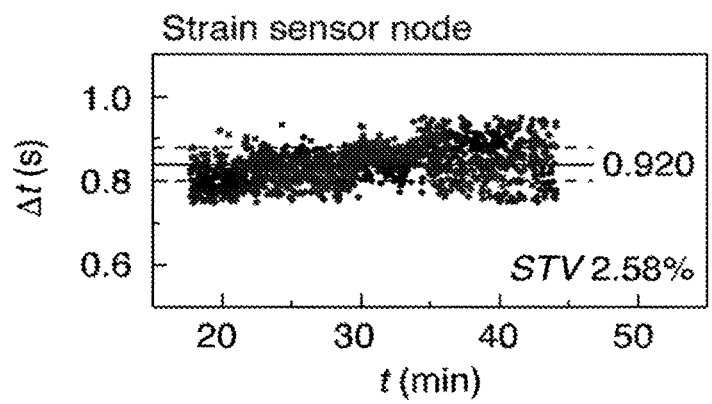
FIG. 15j shows the Δt and STV measured by the strain sensor node according to an example embodiment during phase (3).
Figure 15K:
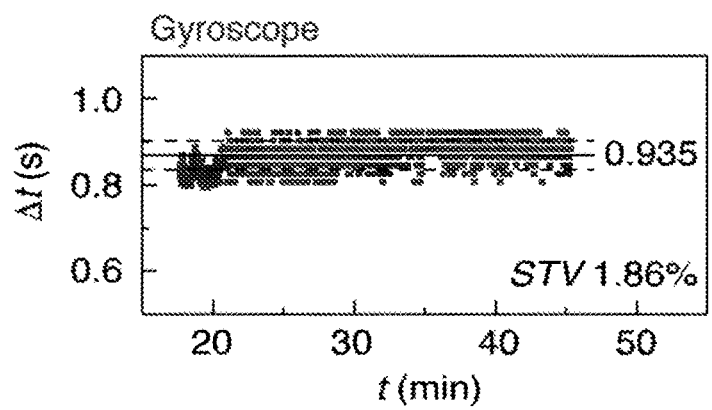
FIG. 15k shows the Δt and STV measured by the gyroscope (reference) during phase (3).

Near-field relays embroidered on the running pants 1500b enabled strain measurements to be simultaneously acquired from a battery-free sensor 1504 mounted on the knee. FIG. 15g shows representative data during the walking phase compared to angular velocity measurements obtained from a battery-powered gyroscope 1510 (FIG. 15a) attached to the ankle, and communicated with the smartphone via Bluetooth. The stride time $\Delta t$ calculated from both signals using a peak detection algorithm show close agreement (<1.5% difference) throughout the variable speed phase (FIG. 15h), indicating that the strain sensor 1504 provides a reliable gait measurement. The data can be used to compute the stride time variability (STV), a clinically relevant marker for neurodegenerative disorders, for applications in performance feedback and intervention. When the treadmill speed v is increased from 2.8 to 9 km/h, the corresponding decrease in STV (2.1% to 1.74%) is less than the decrease in $\Delta t$ (0.98 s to 0.65 s) (FIG. 15i), which is an indicator of the fitness of the subject. For young healthy adults, STV should be less than the 3% over a long duration of exercise. Measurements by both the battery-free strain sensor 1504 and the gyroscope 1512 show that STV remains below this threshold (2.58% and 1.86% respectively) over the remaining duration of the exercise protocol (30 min) (FIG. 15j-k).

In one embodiment, a relay for a near-field communication system is provided comprising a flexible substrate; and an electric circuit on the flexible substrate, wherein the electric circuit comprises a hub inductor pattern configured to receive and transmit via electro-magnetic induction; one or more terminal inductor patterns laterally spaced apart from the hub inductor pattern relative to a surface of the flexible substrate and configured to receive and transmit via electro-magnetic induction; and a connecting trace between the hub inductor and the one or more terminal inductors.

The flexible substrate may comprise textile. The textile may comprise clothing.

The connecting trace may be configured to connect two or more of the terminal inductor patterns in series to the hub inductor.

The connecting trace may be configured to connect two or more of the terminal inductor patterns in parallel to the hub inductor.

The hub inductor pattern, the one or more terminal inductor patterns and the connecting trace may be formed from a conductive thread. The conductive thread may be embroidered on the flexible substrate. The relay may comprise a textile thread securing the conductive thread on the flexible substrate. The conductive thread may comprise one or more of a group consisting of a bare wire, an encapsulated wire, and a tubing filled with a conductive material. The tubing may comprise Perfluoroalkoxy and the conductive material may comprise Galinstan.

In one embodiment, a near-field communication system comprising one or more relays of the embodiments described above.

The system may further comprise one or more sensors/devices configured to receive and transmit via electromagnetic induction and disposable within a near-filed communication range of respective ones of the one or more terminal induction patterns. The one or more sensors/devices may be configured for near-filed communication including data communication and power extraction. The sensors/devices may be disposed at clothing and/or skin, or implanted.

The system may further comprise at least one reader device configured to receive and transmit via electro-magnetic induction and disposable within a near-filed communication range of one of the hub induction patterns. The one or more reader devices may be configured for near-filed communication including data communication and power transmission.

In one embodiment a conductive tubing is provided, comprising a tubing element capable of being embroidered on a textile; and Galinstan filled into the tubing element.

Figure 16:
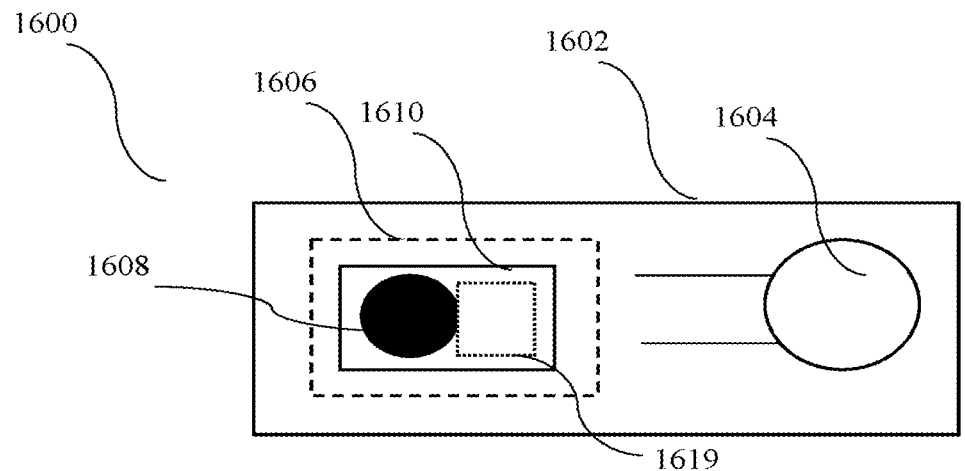
FIG. 16 shows a schematic drawing illustrating a wearable wireless powering system according to an example embodiment.

In one embodiment a wearable wireless powering system 1600 as shown in FIG. 16 is provided comprising a flexible substrate 1602 having an inductor pattern 1604 formed thereon; and a powering source 1606 comprising a battery 1608 and a circuit 1609 on a flexible print circuit board 1610, the powering source 1606 configured to be attachable to the flexible substrate 1602; wherein the powering source 1606 is further configured for near-field power transmission via the inductor pattern 1604 when attached to the flexible substrate 1602.

The circuit 1609 may comprise one or more electronic components, such as micro-controller, near-field communication chip, oscillator, inductors, resistances, capacitors. The components may be soldered on the flexible circuit board 1610.

The powering source 1606 may be attached to the flexible substrate.

The flexible substrate 1602 may comprises textile. The textile may comprise clothing.

Figure 17:
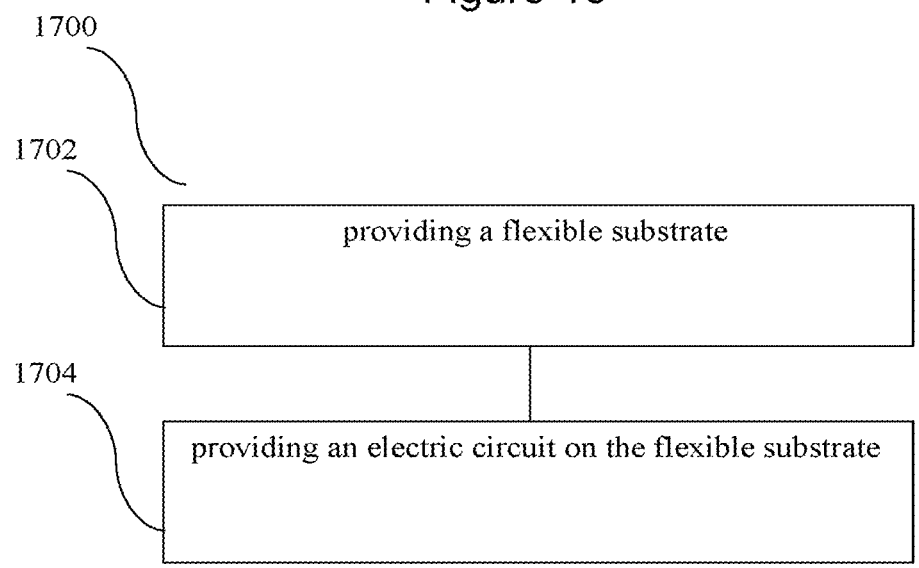
FIG. 17 shows a flowchart illustrating a method of fabricating a relay for a near-field communication system, according to an example embodiment.

FIG. 17 shows a flowchart 1700 illustrating a method of fabricating a relay for a near-field communication system, according to an example embodiment. At step 1702, a flexible substrate is provided. At step 1704, an electric circuit is provided on the flexible substrate, wherein the electric circuit comprises a hub inductor pattern configured to receive and transmit via electro-magnetic induction; one or more terminal inductor patterns laterally spaced apart from the hub inductor pattern relative to a surface of the flexible substrate and configured to receive and transmit via electro-magnetic induction; and a connecting trace between the hub inductor and the one or more terminal inductors.

The flexible substrate may comprise textile. The textile may comprise clothing.

The method may comprise connecting two or more of the terminal inductor patterns in series to the hub inductor.

The method may comprise connecting two or more of the terminal inductor patterns in parallel to the hub inductor.

The hub inductor pattern, the one or more terminal inductor patterns and the connecting trace may be formed from a conductive thread. The method may comprise embroidering the conductive thread on the flexible substrate. The method may comprise using a textile thread for securing the conductive thread on the flexible substrate. The conductive thread may comprise one or more of a group consisting of a bare wire, an encapsulated wire, and a tubing filled with a conductive material. The tubing may comprise Perfluoroalkoxy and the conductive material may comprise Galinstan.

The method may further comprise providing one or more sensors/devices configured to receive and transmit via electro-magnetic induction and disposable within a near-filed communication range of respective ones of the one or more terminal induction patterns. The one or more sensors/devices may be configured for near-filed communication including data communication and power extraction. The method may comprise disposing the sensors/devices at clothing and/or skin, or implanting the sensors/devices.

The method may further comprise providing at least one reader device configured to receive and transmit via electro-magnetic induction and disposable within a near-filed communication range of one of the hub induction patterns. The one or more reader devices may be configured for near-filed communication including data communication and power transmission.

Figure 18:
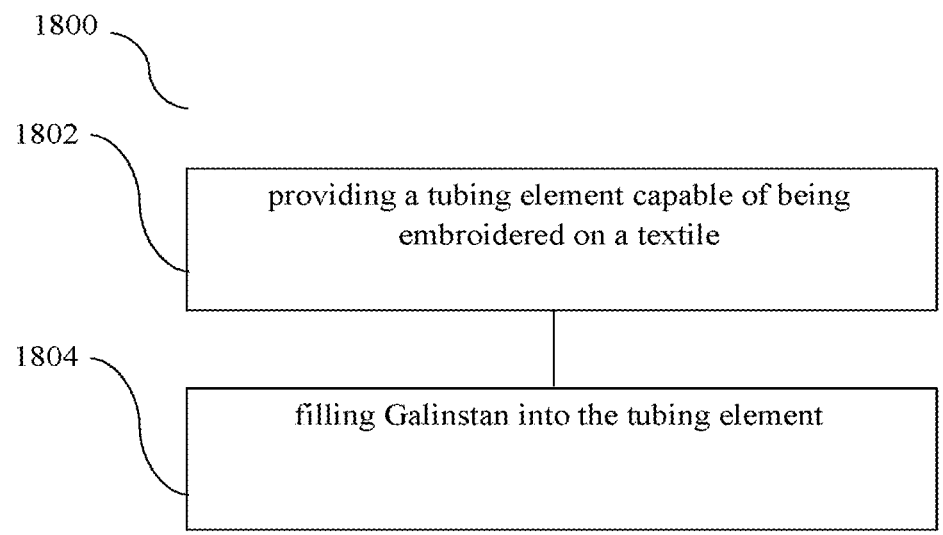
FIG. 18 shows a flowchart illustrating a method of fabricating a conductive tubing, according to an example embodiment.

FIG. 18 shows a flowchart 1800 illustrating a method of fabricating a conductive tubing, according to an example embodiment. At step 1802, a tubing element capable of being embroidered on a textile is provided. At step 1804, Galinstan is filled into the tubing element.

Figure 19:
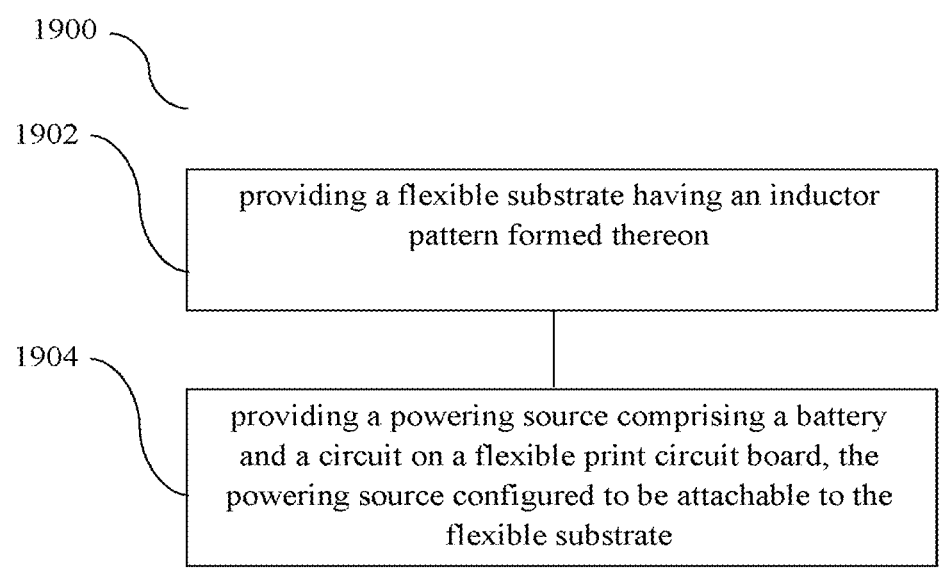
FIG. 19 shows a flowchart illustrating method of fabricating a wearable wireless powering system, according to an example embodiment.

FIG. 19 shows a flowchart 1900 illustrating method of fabricating a wearable wireless powering system, according to an example embodiment. At step 1902, a flexible substrate having an inductor pattern formed thereon is provided. At step 1904, a powering source comprising a battery and a circuit on a flexible print circuit board is provided, the powering source configured to be attachable to the flexible substrate; wherein the powering source is further configured for near-field power transmission via the inductor pattern when attached to the flexible substrate.

The circuit may comprise one or more electronic components, such as micro-controller, near-field communication chip, oscillator, inductors, resistances, capacitors. The components may be soldered on the flexible circuit board.

The method may comprise attaching the powering source to the flexible substrate.

The flexible substrate may comprises textile. The textile may comprise clothing.

As described above, continuous physiological monitoring with battery-free sensors during exercise using near-field-enabled clothing can be provided according to example embodiments. The near-field-enabled clothing according to example embodiments integrate electromagnetically responsive patterns that can extend the connectivity of near-field technologies from a range of a few centimetres around a wireless reader to meter-scale networks of multiple battery-free sensors distributed around the body. Simulations and circuit models illustrate principles and procedures for designing such patterns on clothing according to example embodiments, and example embodiments in posture and exercise monitoring provide continuous wireless powering and sensing in unconstrained environments. Embroidery-compatible conductive tubing with high conductivity, flexibility and stability are provided in example embodiments to enable the near-field clothing with high power transfer efficiency and long-term/comfortable daily wear.

Networks of wearable/implanted sensors interconnected by near-field-enabled clothing according to example embodiments can therefore open engineering and clinical opportunities infeasible with existing approaches. By eliminating rigid and bulky batteries, for example, wireless sensors can be lightweight and physically imperceptible on the skin, enabling improved signal quality and user comfort. These sensors do not need to be removed or recharged and may be left on the body for extended periods of time, provided that a power source at the hub (such as the smartphone) is available. Their low cost also allows single-use operation in which devices are sterilised, deployed on the body, and disposed after use. The ability to perform real-time readout of such sensors with, preferably, a single wearable device allows full-body monitoring for both clinical applications in rehabilitation (physical therapy), radiological imaging, assisted living, as well as athletic applications in performance assessment and fatigue detection.

Compared to alternative electronic textile approaches in which the sensors or readout circuits are directly incorporated into clothing, near-field-enabled clothing according to example embodiments are free of any electronic components that may be vulnerable to washing and daily wear, and can be smoothly conformal on human body to provide robust powering and communication to both skin sensors and implanted devices. The clothing according to example embodiment interacts wirelessly with nearby devices without the need for connectors, and therefore does not require additional effort to use beyond being worn on the body. Since the clothing according to example embodiments directly manipulates the magnetic field distribution around the body, the clothing is compatible with any NFC-enabled device, such as a smartphone, without any modification of the device, and therefore does not induce significant exposure risk beyond that of conventional wireless technologies.

Embodiments of the present invention can have one or more of the following features and associated benefits/advantages.

| Feature | Benefit/Advantage |
|---|---|
| Near-field communication with long working distance and multiplexing | Near-field technologies, which realize wireless powering and communication simultaneously, require close proximity (at most a few centimeters) between sensors and readout devices. The near-field-enabled clothing according to example embodiments is capable of establishing wireless power and data connectivity between multiple far distant points (up to meter scale) on the body to create a network of battery-free skin/implanted sensors. Such networks can therefore open engineering and clinical opportunities infeasible with present approaches, for example, allowing full-body monitoring for both clinical applications in rehabilitation (physical therapy), radiological imaging, assisted living, as well as athletic applications in performance assessment and fatigue detection. |

-continued

| Feature | Benefit/Advantage |
|---|---|
| Wireless, battery-free and secure body sensor network | The near-field-enabled clothing according to example embodiment can interact wirelessly with nearby devices including wireless readout devices and battery-free sensors without the need for connectors, and therefore do not require additional effort to use beyond being worn on the body. By eliminating rigid and bulky batteries, for example, wireless sensors can be lightweight and physically imperceptible on the skin and even inside human body, enabling improved signal quality, user comfort, and minimized immunology response. These sensors do not need to be removed or recharged and may be left on the body for extended periods of time, provided that a single power source at the hub (such as the smartphone) is available. Their low cost also allows single-use operation in which devices are sterilised, deployed on the body, and disposed after use. The reliable communication of the body sensor network according to example embodiments is confined with few centimeters above human body and hence physically secure against eavesdropping attacks, ensuring high security of personal data. |
| Wearable, flexible and conformal wireless powering system | The wireless powering system according to example embodiments relying on near-field communication technologies with its main components of battery, printed circuit board (PCB) and textile-integrated inductor pattern(s) can provide efficient power transfer. Both battery and PCB relying on conventional industry products can be subjected to minimization and attached on near-filed enabled clothing as described herein. The inductor pattern(s) are flexible and lightweight, can be integrated on textile, medical tape, bandage and so on. The well conformal property of the inductor pattern(s) according to example embodiments on the human body facilitates stable wireless powering to both skin and implanted sensors. The wearable feature enables utilization of the system in daily life continuously without limiting human activities. |
| Embroidery-compatible tubing with high conductivity, flexibility and stability. | The conductive tubing according to an example embodiments is fabricated by filling Perfluoroalkoxy tubing with Galinstan. The tubing according to example embodiments is compatible with computer-aided embroidery machine, thus can be automatically integrated on textile in computer-aided design patterns. The high conductive tubing enables the responsive pattern with high quality factor, and eventually the wireless powering system according to an example embodiment with high powering transfer efficiency. Compared with using e.g. copper wire in another example embodiment, the conductive tubing is highly flexible and stable against mechanical bending, which improves wearable comfortability and life-time of the near-field relay. |

Embodiments of the present invention can be well suited for the following commercial applications, by way of example only:

1. The short working distance of near-field communication. Embodiments of the present invention can significantly extent the working distance of near-field communication, realizes wireless powering and communication for battery-free sensors distributed on whole human body.

2. The conflict between electrical conductivity and mechanical flexibility/stability of commercial conductive wires. The near-field enabled clothing according to example embodiments is fabricated by embroidering conductive wires on textile. In an embodiment of the present invention, an embroidery-compatible conductive tubing achieves high electrical conductivity close to copper wire and flexibility/stability comparable to conductive thread.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize.

The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

We claim:

1. A relay for a near-field communication system comprising:
   a flexible substrate; and
   an electric circuit on the flexible substrate,
   wherein the electric circuit comprises
   a hub inductor pattern configured to receive and transmit at least data via electro-magnetic induction;
   two or more terminal inductor patterns different from the hub inductor pattern and laterally spaced apart from the hub inductor pattern relative to a surface of the flexible substrate and configured to receive and transmit at least data via electro-magnetic induction; and
   a connecting trace between the hub inductor and the two or more terminal inductors for transmitting data from the hub inductor to the two or more terminal inductors and vice versa.

2. The relay of claim 1, wherein the flexible substrate comprises textile.

3. The relay of claim 2, wherein the textile comprises clothing.

4. The relay of claim 1, wherein the connecting trace is configured to connect the two or more of the terminal inductor patterns in series to the hub inductor pattern.

5. The relay of claim 1, wherein the connecting trace is configured to connect the two or more of the terminal inductor patterns in parallel to the hub inductor pattern.

6. The relay of claim 1, wherein the hub inductor pattern, the two or more terminal inductor patterns and the connecting trace are formed from a conductive thread.

7. The relay of claim 6, wherein the conductive thread comprises one or more of a group consisting of a bare wire, an encapsulated wire, and a tubing filled with a conductive material.

8. A near-field communication system comprising one or more relays of claim 1.

9. The system of claim 8, further comprising at least one reader device configured to receive and transmit via electro-magnetic induction and disposable within a near-field communication range of one of the hub induction patterns.

10. A method of fabricating a relay for a near-field communication system, comprising the steps of:
    providing a flexible substrate; and
    providing an electric circuit on the flexible substrate,
    wherein the electric circuit comprises
    a hub inductor pattern configured to receive and transmit at least data via electro-magnetic induction;
    one or more terminal inductor patterns different from the hub inductor pattern and laterally spaced apart from the hub inductor pattern relative to a surface of the flexible substrate and configured to receive and transmit at least data via electro-magnetic induction; and
    a connecting trace between the hub inductor and the two or more terminal inductors for transmitting data from the hub inductor to the two or more terminal inductors and vice versa.

11. The method of claim 10, wherein the flexible substrate comprises textile.

12. The method of claim 11, wherein the textile comprises clothing.

13. The method of claim 10, comprising connecting the two or more of the terminal inductor patterns in series to the hub inductor pattern.

14. The method of claim 10, comprising connecting the two or more of the terminal inductor patterns in parallel to the hub inductor pattern.

15. The method of claim 10, wherein the hub inductor pattern, the two or more terminal inductor patterns and the connecting trace are formed from a conductive thread.

16. The method of claim 15, wherein the conductive thread comprises one or more of a group consisting of a bare wire, an encapsulated wire, and a tubing filled with a conductive material.

17. The method of claim 10, further comprising providing one or more sensors/devices configured to receive and transmit via electro-magnetic induction and disposable within a near-field communication range of respective ones of the two or more terminal induction patterns.

18. The method of claim 17, wherein the one or more sensors/devices are configured for near-field communication including data communication and power extraction.

19. The method claim 17, comprising disposing the sensors/devices at clothing and/or skin, or implanting the sensors/devices.

20. The method of claim 10, further comprising providing at least one reader device configured to receive and transmit via electro-magnetic induction and disposable within a near-field communication range of one of the hub induction patterns.

\* \* \* \* \*